(12) United States Patent
Ueno

(10) Patent No.: US 8,264,488 B2
(45) Date of Patent: Sep. 11, 2012

(54) INFORMATION PROCESSING APPARATUS, INFORMATION PROCESSING METHOD, AND PROGRAM

(75) Inventor: Hiroshi Ueno, Osaka (JP)

(73) Assignee: ProField Co., Ltd., Osaka (JP)

( * ) Notice: Subject to any disclaimer, the term of this patent is extended or adjusted under 35 U.S.C. 154(b) by 531 days.

(21) Appl. No.: 12/360,905

(22) Filed: Jan. 28, 2009

(65) Prior Publication Data

US 2009/0195540 A1 Aug. 6, 2009

(30) Foreign Application Priority Data

Feb. 4, 2008 (JP) ................. 2008-024109

(51) Int. Cl.
*G06T 15/10* (2006.01)
*G06T 15/40* (2006.01)
*G06T 15/00* (2006.01)
*G06T 17/00* (2006.01)

(52) U.S. Cl. ......... 345/427; 345/421; 345/419; 345/420

(58) Field of Classification Search ................. None
See application file for complete search history.

(56) References Cited

U.S. PATENT DOCUMENTS

| 6,147,687 | A * | 11/2000 | Wanderski | 715/853 |
| 6,597,358 | B2 * | 7/2003 | Miller | 345/427 |
| 7,549,129 | B2 * | 6/2009 | Sheldon et al. | 715/835 |
| 7,765,494 | B2 * | 7/2010 | Brunswig et al. | 715/853 |

FOREIGN PATENT DOCUMENTS

| JP | 11-194864 A | 7/1999 |
| JP | 2001-084030 A | 3/2001 |
| JP | 2003141166 | 5/2003 |
| JP | 2006-338599 A | 12/2006 |

OTHER PUBLICATIONS

Wiss, U.; Carr, D.; Jonsson, H.; , "Evaluating three-dimensional information visualization designs: a case study of three designs," Information Visualization, 1998. Proceedings. 1998 IEEE Conference on , vol., no., pp. 137-144, Jul. 29-31, 1998.*
Rekimoto, Jun and Green, Mark. Dec. 5, 1993. The Information Cube: Using Transparency in 3D Information Visualization. In Proceedings of the Third Annual Workshop on Information Technologies & Systems (WITS'93): 125-131.*
Office Action from Japanese Patent App. No. 2008-024109 (Jan. 27, 2012).

* cited by examiner

*Primary Examiner* — Kee M Tung
*Assistant Examiner* — Zhengxi Liu
(74) *Attorney, Agent, or Firm* — Cermak Nakajima LLP; Tomoko Nakajima

(57) ABSTRACT

Provided is a shape information storage portion in which shape information, which is information specifying a shape of a solid object, which is a three-dimensional object, can be stored; a placement information storage portion in which placement information, which is one or more pieces of information that can be placed on a surface constituting the solid object, can be stored; an acquisition condition information storage portion in which acquisition condition information, which is information indicating a condition for acquiring information that is to be each placed on one or more surfaces constituting the solid object from the placement information, can be stored; and a surface information acquiring portion that acquires surface information, which is information that is to be placed on one or more surfaces of the solid object, from the placement information, using the acquisition condition information.

21 Claims, 32 Drawing Sheets

| object ID | size x | size y | size z | corresponding group |
|---|---|---|---|---|
| OBJ1 | 100 | 100 | 100 | product name "washing machine" |
| OBJ2 | 100 | 100 | 100 | product name "iron" |
| OBJ3 | 100 | 100 | 100 | product name "refrigerator" |

FIG.3

| object ID | coordinates (x, y, z) | rotation angle (x, y, z) |
|---|---|---|
| OBJ1 | (100, 300, 100) | (0, 0, 0) |
| OBJ2 | (300, 300, 100) | (0, 0, 0) |
| OBJ3 | (500, 300, 100) | (0, 0, 0) |

FIG.4

| front surface | back surface | top surface | bottom surface | left surface | right surface |
|---|---|---|---|---|---|
| product name, color | – | specification | – | month of sale | price |

FIG.5

```
<product name>
    <product name>washing machine</product name>
    <color> washing machine red.gif</color>
    <color>washing machine white.gif</color>
    <color>washing machine black.gif</color>
    <price>150,000 yen</price>
    <specification>dry function</specification>
    <specification>ionization function</specification>
    <manufacturer>ABC electrics</manufacturer>
    <month of sale>September 2007</month of sale>
</product>
<product>
    <product name>iron</product name>
    <color>iron black.gif</color>
    <color>iron white.gif</color>
    <price>10,000 yen</price>
    <specification>steam</specification>
    <manufacturer>ABC electrics</manufacturer>
    <month of sale>October 2007</month of sale>
</product>
<product>
    <product name>iron</product name>
```
⋮

FIG.6

| object ID | coordinates (x, y, z) | rotation angle (x, y, z) |
|---|---|---|
| OBJ1 | (100, 400, 100) | (0, 90°, 0) |
| OBJ2 | (300, 300, 100) | (0, 0, 0) |
| OBJ3 | (500, 300, 100) | (0, 0, 0) |

FIG.9

| front surface | back surface | top surface | bottom surface | left surface | right surface |
|---|---|---|---|---|---|
| product name, color | – | specification | – | month of sale | manufacturer |

FIG.12

| object ID | front surface | back surface | top surface | bottom surface | left surface | right surface |
|---|---|---|---|---|---|---|
| OBJ5 | select "product name" from " " catalog.xml" where "price ? 50,000 yen" | – | – | – | – | price |

FIG.15

| front surface | back surface | top surface | bottom surface | left surface | right surface |
|---|---|---|---|---|---|
| product name, color | – | specification | – | month of sale | AVE "price" |

FIG.17

| object ID | size x | size y | size z | corresponding group | corresponding acquisition condition |
|---|---|---|---|---|---|
| OBJ11 | 200 | 200 | 200 | catalog name "electric appliance" | catalog |
| OBJ12 | 50 | 50 | 50 | product name "washing machine" | product |
| OBJ13 | 50 | 50 | 50 | product name "iron" | product |

FIG.20

| object ID | coordinates (x, y, z) | rotation angle (x, y, z) |
|---|---|---|
| OBJ11 | (300, 300, 300) | (0, 0, 0) |
| OBJ12 | (350, 250, 250) | (0, 0, 0) |
| OBJ13 | (350, 350, 250) | (0, 0, 0) |

FIG.21

| front surface | back surface | top surface | bottom surface | left surface | right surface | corresponding acquisition condition |
|---|---|---|---|---|---|---|
| catalog name | – | – | – | – | – | catalog |
| product name | – | specification | – | month of sale | price | product |

FIG.22

```
<catalog>
        <catalog name>electric appliance</catalog name>
        <product name>
                <product name>washing machine</product name>
                <color>washing machine red.gif</color>
                <color>washing machine white.gif</color>
                <color>washing machine black.gif</color>
                <price>150,000 yen</price>
                <specification>dry function</specification>
                <manufacturer>ABC electrics</manufacturer>
                <month of sale>September 2007</month of sale>
        </product>
        <product>
                <product name>iron</product name>
                <color>iron black.gif</color>
                <color>iron white.gif</color>
                <price>10,000 yen</price>
                <specification>steam</specification>
                <manufacturer>ABC electrics</manufacturer>
                <month of sale>October 2007</month of sale>
        </product>
</catalog>
```

| object ID | higher level in hierarchy |
|---|---|
| OBJ11 | – |
| OBJ12 | OBJ11 |
| OBJ13 | OBJ11 |

FIG.24

| object ID | coordinates (x, y, z) | rotation angle (x, y, z) |
|---|---|---|
| OBJ11 | (350, 300, 300) | (0, −90°, 0) |
| OBJ12 | (300, 250, 250) | (0, −90°, 0) |
| OBJ13 | (300, 350, 250) | (0, −90°, 0) |

FIG.26

| target specifying information | size x | size y | size z | corresponding acquisition condition |
|---|---|---|---|---|
| catalog | 200 | 200 | 200 | catalog |
| product | 50 | 50 | 50 | product |

FIG.30

INFORMATION PROCESSING APPARATUS, INFORMATION PROCESSING METHOD, AND PROGRAM

This application claims the priority benefit under 35 U.S.C. §119 of Japanese Patent Application No. 2008-024109 filed on Feb. 4, 2008, which is hereby incorporated in its entirety by reference.

BACKGROUND OF THE INVENTION

1. Field of the Invention

The present invention relates to an information processing apparatus or the like, for example, for outputting information of a product or the like to a display or the like.

2. Description of Related Art

For example, a conventional information processing apparatus is disclosed in which a retrieval and selection screen display means displays first and second graphic sections, a character retrieval section, a selection candidate list section, an accessory list section, and a tree view section on a single screen, and images of products are displayed in the first graphic section based on the product information stored in a storage means. If a product is selected in this section or in any of the above-described sections, the selected product and the accessories of that product are also simultaneously displayed in a highlighted manner on this screen. Furthermore, these sections are linked to each other such that they change information displayed on screens in conjunction with one another. Accordingly, if a product is selected on any of the sections, the information related to the selected product is automatically displayed on the other sections (for example, see JP 2003-141166A (page 1, FIG. 1, etc.)

However, when one or more pieces of information, including, for example, the above-described information of accessories or the like, or one or more pieces of hierarchized information or the like are included for one item such as a product, it was difficult for conventional information processing apparatuses to appropriately display those pieces of information in a manner in which the correlation between the information and the item such as a product can be recognized.

For example, in a case where one product and information relating to that product, such as its accessories, are displayed in different areas of one screen, as in JP 2003-141166A, if the number of different areas increases, then only information relating to one product can be displayed on one screen. When the distance between the section in which the product is displayed and the section in which the accessories are displayed is large, then one has to move the line of sight greatly, making it difficult to recognize the correlation between the product and the accessories. Furthermore, when multiple products and information or the like relating to the accessories or the like of those products are displayed on one screen, it is difficult to judge which product is related to which accessory or the like at one glance.

Similarly, with conventional file systems and the like that manages hierarchized information, it was difficult to display, for example, the correlation between a file and the information about that file, or the correlation between a so-called folder or directory and a file contained therein, in an easily understandable manner.

Furthermore, when correlated pieces of information are displayed together by conventional information processing apparatuses, it was not possible to easily modify the correlation between them and display such modification. For example, it was difficult to dynamically change correlated pieces of information.

As described above, the conventional techniques have the problem that the correlation between pieces of information cannot be displayed in a clearly understandable manner.

SUMMARY OF THE INVENTION

An information processing apparatus according to the present invention includes: a shape information storage portion in which shape information, which is information specifying a shape of a solid object, which is a three-dimensional object, can be stored; a placement information storage portion in which placement information, which is one or more pieces of information that can be placed on a surface constituting the solid object, can be stored; an acquisition condition information storage portion in which acquisition condition information, which is information indicating a condition for acquiring information that is to be each placed on one or more surfaces constituting the solid object from the placement information, can be stored; a surface information acquiring portion that acquires surface information, which is information that is to be placed on one or more surfaces of the solid object, from the placement information, using the acquisition condition information; an image information configuration portion that reads the shape information of the solid object, and configures, for one or more surfaces of the read solid object, image information in which the surface information acquired by the surface information acquiring portion is placed; and an output portion that outputs the image information configured by the image information configuration portion.

With this configuration, it is possible to acquire the placement information, using the acquisition condition information, and to output the correlated pieces of placement information on the surfaces of one solid object, thereby outputting the correlation between pieces of information in an easily understandable manner. Furthermore, by using the acquisition condition information to acquire the placement information, it is possible to dynamically acquire the information displayed on the surfaces of a solid object. Consequently, it is possible to dynamically modify pieces of information that have been output in a correlated manner using a solid object.

Furthermore, the above-described information processing apparatus of the present invention may further include an object placement information storage portion in which object placement information, which is information specifying the placement of the solid object, can be stored, wherein the image information configuration portion configures image information in which the solid object is placed as specified by the object placement information.

With this configuration, it is possible to display a solid object in a predetermined placement, thereby outputting the correlation between pieces of information.

Furthermore, the above-described information processing apparatus of the present invention may further include: a modification instruction accepting portion that accepts a modification instruction for the placement of the solid object; and an object placement information updating portion that updates, according to the modification instruction accepted by the modification instruction accepting portion, the object placement information of the solid object that is stored in the object placement information storage portion and to which said modification instruction is targeted.

With this configuration, it is possible to modify the placement of a solid object in accordance with an instruction from a user, thereby displaying pieces of information placed on various surfaces of a solid object with a better view as appropriate.

Furthermore, in the above-described information processing apparatus of the present invention, a configuration can be adopted in which the solid object has a hierarchical relationship with other solid objects, and when the placement of a solid object at a higher level in hierarchy among the solid objects has been modified, the placement of a solid object at a lower level in hierarchy that directly belongs to the solid object whose placement has been modified is modified such that the relative placement relationship with said solid object whose placement has been modified is maintained.

With this configuration, even in a case where the placement of a solid object at a higher level in hierarchy is modified, the placement of a solid object at a lower level in hierarchy can also be modified following the modification of that solid object at a higher level in hierarchy, and therefore, the orientation and the position of pieces of information output on the surfaces of the solid object at a lower level in hierarchy can be modified at once.

Furthermore, in the above-described information processing apparatus of the present invention, a configuration can be adopted in which the object placement information of a solid object at a lower level in hierarchy among the object placement information that can be stored in the object placement information storage portion is constituted by information specifying the relative placement with respect to a solid object at a higher level in hierarchy to which said solid object directly belongs.

With this configuration, even if the placement of a solid object at a higher level in hierarchy is modified, it is not necessary to modify the object placement information of a solid object at a lower level in hierarchy, which facilitates the management and the update of the object placement information.

Furthermore, the above-described information processing apparatus of the present invention may further include a first hierarchical information storage portion in which first hierarchical information which is hierarchical information specifying a hierarchical relationship between the solid objects, can be stored, wherein the object placement information updating portion updates, according to a modification instruction for the placement of a solid object that has been accepted by the modification instruction accepting portion, the object placement information of a solid object at a lower level in hierarchy than that of the solid object to which the modification instruction is targeted such that the relative placement relationship with the solid object to which the modification instruction is targeted will not be changed, using the first hierarchical information.

With this configuration, even if the placement of a solid object at a higher level in hierarchy is modified, it is not necessary to modify the object placement information of a solid object at a lower level in hierarchy, which facilitates the management and the update of the object placement information.

Furthermore, the above-described information processing apparatus of the present invention may further include: a placement information accepting portion that accepts placement information having a hierarchical relationship; a placement information accumulating portion that accumulates the placement information in the placement information storage portion; and a placement processing portion that acquires the shape information of a solid object that has a hierarchical relationship corresponding to hierarchy levels of the placement information accepted by the placement information accepting portion, and accumulates said shape information in the object placement information storage portion.

With this configuration, it is possible to create information for outputting a solid object corresponding to the placement information in an easy and prompt manner, making it possible to automate the processing.

Furthermore, in the above-described information processing apparatus of the present invention, a configuration can be adopted in which the solid object includes a folder object, which is a solid object for indicating a hierarchical structure between one or more solid objects.

With this configuration, it is possible to output the hierarchical relationship between solid objects in an easily understandable manner, using the folder object.

Furthermore, the above-described information processing apparatus of the present invention may further include: an acquisition condition information accepting portion that accepts the acquisition condition information for one or more surfaces constituting the solid object; and an acquisition condition information updating portion that updates the acquisition condition information stored in the acquisition condition information storage portion using the acquisition condition information accepted by the acquisition condition information accepting portion.

With this configuration, by modifying the condition for acquiring the placement information output on the surfaces of a solid object, it is possible to modify the placement information output on the surfaces.

Furthermore, in the above-described information processing apparatus of the present invention, a configuration can be adopted in which the acquisition condition information stored in the acquisition condition information storage portion is a retrieval formula, and the surface information acquiring portion acquires the placement information that matches the retrieval formula of the acquisition condition information as the surface information.

With this configuration, it is possible to dynamically acquire the placement information output on the surfaces of a solid object. For example, by modifying the placement information, it is possible to modify the placement information output on those surfaces.

Furthermore, in the above-described information processing apparatus of the present invention, a configuration can be adopted in which the placement information is tagged information, the acquisition condition information stored in the acquisition condition information storage portion is information specifying a tag of the placement information that is to be acquired, and the surface information acquiring portion acquires the placement information specified by the acquisition condition information as the surface information.

With this configuration, it is possible to acquire the information of the element of the tag specified by the acquisition condition information, as the placement information output on the surfaces. Accordingly, it is possible to modify the information output on the surfaces by modifying the element of the tag.

With the information processing apparatus according to the present invention, it is possible to output the correlation between pieces of information in a clearly understandable manner.

BRIEF DESCRIPTION OF THE DRAWINGS

FIG. 3 shows a shape information management table of the same information processing apparatus.

FIG. 4 shows an object placement information management table of the same information processing apparatus.

FIG. 5 shows an example of an acquisition condition information management table of the same information processing apparatus.

FIG. 6 shows an example of placement information of the same information processing apparatus.

FIG. 9 shows an example of object placement information management information of the same information processing apparatus.

FIG. 12 shows an example of acquisition condition information of the same information processing apparatus.

FIG. 15 shows an example of acquisition condition information of the same information processing apparatus.

FIG. 17 shows an example of acquisition condition information of the same information processing apparatus.

FIG. 20 shows an example of shape information management table of the same information processing apparatus.

FIG. 21 shows an object placement information management table of the same information processing apparatus.

FIG. 22 shows an example of acquisition condition information management table of the same information processing apparatus.

FIG. 23 shows an example of placement information of the same information processing apparatus.

FIG. 24 shows an example of a first hierarchical information management table of the same information processing apparatus.

FIG. 26 shows an example of object placement information of the same information processing apparatus.

FIG. 30 shows an example of setting shape information of the same information processing apparatus.

DETAILED DESCRIPTION OF THE INVENTION

Figure 1:
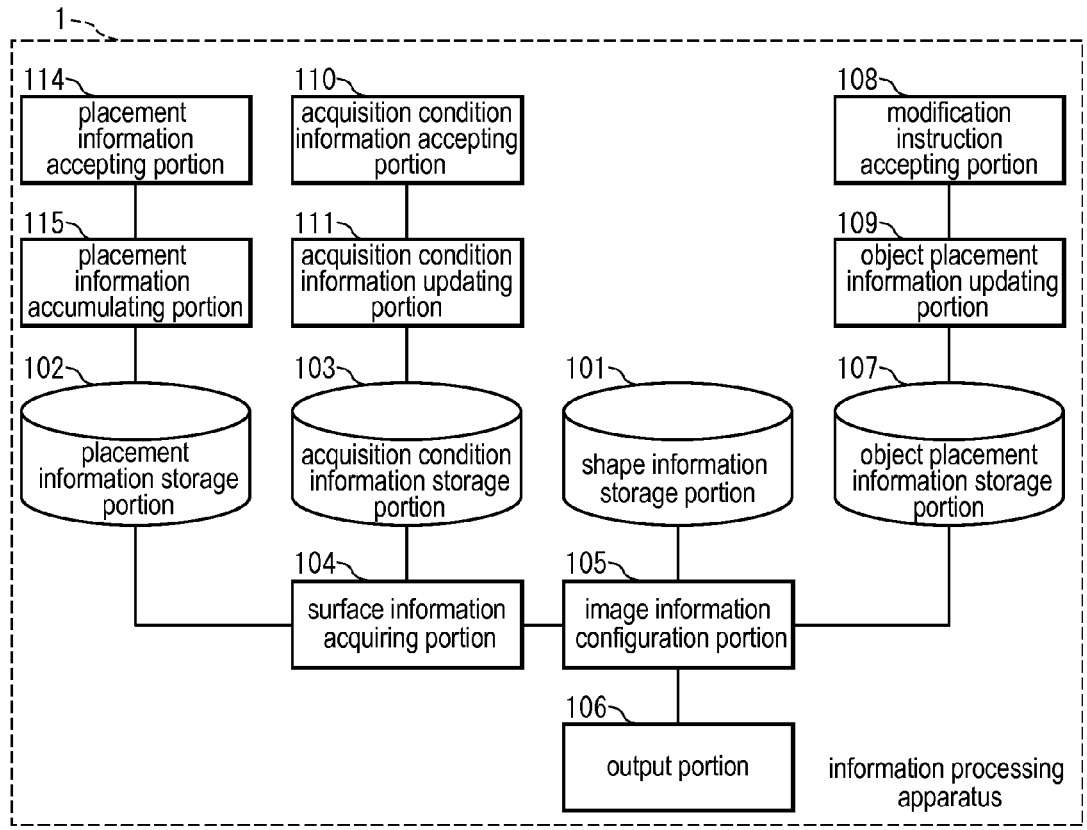
FIG. 1 is a block diagram showing an information processing apparatus according to Embodiment 1.

Hereinafter, embodiments of an information processing apparatus or the like will be described with reference to the accompanying drawings. Note that components denoted by the same reference numerals in the embodiments perform similar operations, and therefore, an overlapping description thereof may be omitted.

Embodiment 1

FIG. 1 is a block diagram showing an information processing apparatus according to this embodiment.

The information processing apparatus 1 includes a shape information storage portion 101, a placement information storage portion 102, an acquisition condition information storage portion 103, a surface information acquiring portion 104, an image information configuration portion 105, an output portion 106, an object placement information storage portion 107, a modification instruction accepting portion 108, an object placement information updating portion 109, an acquisition condition information accepting portion 110, an acquisition condition information updating portion 111, a placement information accepting portion 114, and a placement information accumulating portion 115.

The information processing apparatus 1 according to this embodiment is, for example, an information apparatus, including for example, a computer, a mobile phone, a PDA (personal digital assistant), a highly-functional mobile phone configured by combining a mobile phone and an information terminal, a portable digital music player, and an audio-visual device with a display device, such as a television. The same applies to other embodiments.

Shape information, which is information specifying the shape of a solid object, which is a three-dimensional object, may be stored in the shape information storage portion 101. The shape information refers to information defining the shape or the like of an object that can be used in a virtual 3D space. The shape information is, for example, so-called modeling information of a solid object. A solid object as described herein includes, for example, an object called a 3D object, a 3D model, and a solid model. The shape information is, for example, information of the coordinates of vertices of a solid object, information of parameters of an equation expressing a border line, a surface, or the like. A solid object ordinarily includes information defining a surface or information that can be used to define a surface, and is formed by one or more surfaces. Solid objects can be classified into those modeled by polygonal modeling, those modeled by modeling using a free-form surface, and the like, depending on the method of configuring the surfaces, for example. The shape information may include information of a setting item used when outputting a solid object, such as the color, the transparency, the reflectance, the refractive index, or the bumps of a solid object. The shape information of one or more solid objects may be stored in the shape information storage portion 101. The shape of the solid objects may be any shape, including, for example, a sphere, a cylinder, a polyhedron such as a hexahedron or an octahedron, a cube, a cone, and a pyramid. The unit or the like of the shape information, such as the size, may be an absolute unit, or may be a relative unit. Further, it is possible to adopt a configuration in which the same shape information or the like that can be applied to multiple solid objects is referred to using link information or the like so that they can be provided for common use. Although the shape information storage portion 101 is preferably a nonvolatile recording medium, it can also be implemented by a volatile recording medium.

Placement information, which is made up of one or more pieces of information that can be placed on the surfaces constituting a solid object, may be stored in the placement information storage portion 102. The placement information may be any information, including, for example, image information such as a still image or a moving image, and text information, as long as the information can be placed on the surfaces constituting a solid object, and can be output, for example, displayed. The placement as described herein may be considered as the so-called mapping of image information for the surfaces of a solid object. The placement information may be considered as information that is a target of mapping, including, for example, texture information. The placement information may have any data structure. For example, the placement information may be tagged information. Alternatively, the placement information may be information that is managed in association with an attribute or the like, using a table or a database. The placement information may also be grouped in advance. Although the placement information storage portion 102 is preferably a nonvolatile recording medium, it can be implemented by a volatile recording medium.

Acquisition condition information, which is information indicating a condition for acquiring, from the placement information, pieces of information respectively placed on one or more surfaces constituting a solid object, may be stored in the acquisition condition information storage portion 103. Acquisition condition information for acquiring pieces of information respectively placed on all the surfaces constituting a solid object, or acquisition condition information for acquiring pieces of information placed on some of the surfaces may be stored in the acquisition condition information storage portion 103. The acquisition condition information may be any information, as long as it can eventually specify one or more pieces of placement information placed on surfaces of one or more surfaces of a solid object. For example, when the placement information is divided into items, the acquisition condition information may be information specifying those items. When the placement information has an attribute, the acquisition condition information may be information specifying that attribute. When a tag is added to the placement information, the acquisition condition information may be information specifying the name of that tag. When index information is added to the placement information, the acquisition condition information may be information specifying that index. The acquisition condition information may be information specifying the location, file name, directory, or the like of the placement information. The acquisition condition information may also be a retrieval formula or an arithmetic formula for retrieving the placement information. Note that the retrieval formula may not necessarily be presented in the form of a formula, and may be a keyword or the like that can be used for retrieval. The acquisition condition information indicated by such a retrieval formula may be, for example, a combination of "select", "from", "where" and the like. Here, "select" is an item of the placement information that is to be acquired, "from" is information specifying multiple pieces of placement information that are targets of retrieval, "where" is information indicating a condition for retrieval (see, the specification of SQL). The acquisition condition information indicated by an arithmetic formula is, for example, an arithmetic formula applied to one or more pieces of placement information, including, for example, information represented in numerical values for specifying two pieces of placement information, and information represented in the form of an arithmetic formula or the like for calculating the average of those pieces of placement information, or information represented in the form of an arithmetic formula or the like for adding/subtracting a predetermined time to/from the current time. The acquisition condition information may be specified separately for each individual solid object that may be a target of output, or may be specified to be applicable for all solid objects. The acquisition condition information may also be specified to be applicable for some group of solid objects. When an attribute or the like is set for solid objects, the acquisition condition information may be specified to be applicable for solid objects having a matching attribute. Furthermore, the acquisition condition information may be specified in advance for each surface of a solid object, or may be specified in a random manner for each surface. Although the acquisition condition information storage portion 103 is preferably a nonvolatile recording medium, it may be implemented by a volatile recording medium.

The surface information acquiring portion 104 acquires, from the placement information, surface information, which is information that is to be placed on one or more surfaces of each solid object indicated by the shape information stored in the shape information storage portion 101, using the acquisition condition information stored in the acquisition condition information storage portion 103. Specifically, the surface information acquiring portion 104 acquires the placement information specified by the acquisition condition information set for each surface of each solid object as the surface information. For example, when the acquisition condition information set for one surface of a solid object is a retrieval formula, the surface information acquiring portion 104 acquires the placement information that matches the retrieval formula of the acquisition condition information as the surface information. When the acquisition condition information is an arithmetic formula, the surface information acquiring portion 104 performs an arithmetic operation to acquire the surface information. When the placement information is grouped and the grouped placement information is associated with the shape information of each solid object (for example, when each piece of shape information contains information specifying a group), the surface information acquiring portion 104 acquires, as the surface information, the placement information that matches the acquisition condition information from the group of placement information associated with that solid object. The surface information acquiring portion 104 may be ordinarily implemented by an MPU, a memory or the like. The processing procedure of the surface information acquiring portion 104 is ordinarily implemented using software, and that software is recorded in a recording medium such as a ROM. However, the processing procedure may be implemented using hardware (a dedicated circuit).

The image information configuration portion 105 reads the shape information of a solid object, and configures, for one or more surfaces of the read solid object, image information in which the surface information acquired by the surface information acquiring portion 104 is placed according to the acquisition condition information corresponding to each of the surfaces. The image information configured here is, for example, image information that is eventually used when performing output (e.g., display). This image information is, for example, bitmap data or the like. The processing of configuring the image information also includes configuring display image information, including, for example, bitmap data or the like, from text information or the like. The processing of configuring a two-dimensional image by placing information such as image information or text information for surfaces of a solid object is the so-called rendering, which is a known technique. Therefore, a description thereof has been omitted. In the processing of configuring the image information, rendering may be performed using information of a setting item such as the color, transparency, reflectance, refractive index, or the bumps of a solid object included in the shape information or the like. The image information configuration portion 105 may be ordinarily implemented by an MPU, a GPU (graphics processing unit), a memory, or the like. The processing procedure of the image information configuration portion 105 is ordinarily implemented using software, and that software is recorded in a recording medium such as a ROM. However, the processing procedure may be implemented using hardware (a dedicated circuit).

The output portion 106 outputs the image information configured by the image information configuration portion 105. The output as described herein is a concept including display on a display, projection using a projector, transmission to an external apparatus, accumulation into a recording medium, delivery of the processing results to another processing apparatus or another program, and the like. The output portion 106 may be considered to include or not to include an output device such as a display. The output portion 106 may be implemented, for example, by the driver software of an output device, or the driver software of an output device and the output device.

Object placement information, which is information specifying the placement of a solid object, may be stored in the object placement information storage portion 107. The placement as described herein is placement in a virtual three-dimensional space. This placement is a concept including, for example, a combination of the position and the orientation of a solid object. The object placement information may be any information that can eventually specify the placement of a solid object, including, for example, information specifying the coordinates of the position at which a solid object is placed, or the orientation of a solid object. Alternatively, the object placement information may be information specifying the size or the like of a solid object. The coordinates specifying the position of a solid object may be absolute coordinates set in a virtual three-dimensional space, or may be relative coordinates set with respect to another solid object or the like. The coordinates specifying the position of a solid object may also be the coordinates of vertices where sides or the like constituting that solid object meet, or the coordinates of the center or the like of a solid object. Here, the image information configuration portion 105 described above reads this object placement information, and configures image information in which the solid object is placed at the position in a virtual three-dimensional space that is indicated by this object placement information. Note that although a case is described here in which the object placement information and the shape information of a solid object are provided separately, the object placement information may be included in the shape information. For example, by setting the information of the vertex of the shape information to be absolute coordinates, the placement of a solid object can be specified using the shape information as the object placement information. Although the object placement information storage portion 107 is preferably a nonvolatile recording medium, it may also be implemented by a volatile recording medium.

The modification instruction accepting portion 108 accepts a modification instruction for the placement of a solid object. The acceptance as described herein refers to acceptance from an input means, reception of an input signal transmitted from another device or the like, reading of information from a recording medium or the like. The modification instruction may be, for example, a command for modifying the placement of a solid object, including, for example, "rotate about the x-axis by 90°", or information or the like of the coordinates specifying the placement of a solid object after modification. The input means of the modification instruction may be a numeric keypad, a keyboard, a mouse, a menu screen, or any other means. For example, it is possible to adopt a configuration in which an instruction to move the position of a solid object in a virtual three-dimensional space or an instruction to change the orientation of a solid object (e.g., rotate) in a virtual three-dimensional space when a portion of the surface of a solid object displayed on a display or the like (not shown) is clicked or a surface or a side of the solid object is dragged. For example, the modification instruction accepting portion 108 may accept a modification instruction for placement to cause one of the side surfaces of a solid object to face the front when that side surface is clicked. Accepting an instruction to modify the placement through manipulation of the displayed solid object using a mouse or the like is preferable because intuitive manipulation performed by a user can be accepted. The modification instruction accepting portion 108 may be implemented, for example, by the device driver of an input means such as a numeric keypad, a keyboard, or a mouse, or the control software of a menu screen.

According to the modification instruction accepted by the modification instruction accepting portion 108, the object placement information updating portion 109 updates the object placement information, stored in the object placement information storage portion 107, of the solid object to which that modification instruction is directed. For example, when the modification instruction includes, for example, information of the modified coordinates or information of the modified orientation, the object placement information updating portion 109 may update the object placement information using the information of the modified coordinates or the information of the modified orientation. When the modification instruction is a command or the like instructing modification of the placement, the object placement information updating portion 109 may calculate information of the modified coordinates, information of the modified orientation, or the like based on that command and the current object placement information, and may update the object placement information using the calculated information. The object placement information updating portion 109 may be ordinarily implemented by an MPU, a memory or the like. The processing procedure of the object placement information updating portion 109 is ordinarily implemented using software, and that software is recorded in a recording medium such as a ROM. However, the processing procedure may be implemented using hardware (a dedicated circuit). Note that when the object placement information is included in the shape information as described above, modification of the shape information according to the modification instruction substantially corresponds to modification of the object placement information.

The acquisition condition information accepting portion 110 accepts the above-described acquisition condition information for one or more surfaces constituting a solid object. The acquisition condition information accepting portion 110 may accept all the acquisition condition information, or may accept only those pieces of acquisition condition information that require update or addition. The acceptance as described herein refers to acceptance from an input means, reception of an input signal transmitted from another device or the like, reading of accumulation into a recording medium or the like. The input means of the acquisition condition information may be a numeric keypad, a keyboard, a mouse, a menu screen, or any other means. The acquisition condition information accepting portion 110 may be implemented, for example, by the device driver of an input means such as a numeric keypad or a keyboard, or the control software of a menu screen.

The acquisition condition information updating portion 111 updates the acquisition condition information stored in the acquisition condition information storage portion 103, using the acquisition condition information received by the acquisition condition information accepting portion 110. For example, the acquisition condition information updating portion 111 adds or overwrites the acquisition condition information. The acquisition condition information updating portion 111 may be ordinarily implemented by an MPU, a memory or the like. The processing procedure of the acquisition condition information updating portion 111 is ordinarily implemented using software, and that software is recorded in a recording medium such as a ROM. However, the processing procedure may be implemented using hardware (a dedicated circuit).

The placement information accepting portion 114 accepts the placement information. The placement information accepting portion 114 may accept all the placement information, or may accept only those pieces of placement information that require update or addition. The acceptance as described herein refers to acceptance from an input means, reception of an input signal transmitted from another device or the like, reading of accumulation into a recording medium or the like. The input means of the placement information may be a numeric keypad, a keyboard, a mouse, a menu screen, or any other means. The placement information accepting portion 114 may be implemented, for example, by the device driver of an input means such as a numeric keypad or a keyboard, or the control software of a menu screen.

The placement information accumulating portion 115 updates the acquisition condition information stored in the placement information storage portion 102, using the placement information received by the placement information accepting portion 114. For example, the placement information accumulating portion 115 adds or overwrites the placement information. The placement information accumulating portion 115 may be ordinarily implemented by an MPU, a memory or the like. The processing procedure of the placement information accumulating portion 115 is ordinarily implemented using software, and that software is recorded in a recording medium such as a ROM. However, the processing procedure may be implemented using hardware (a dedicated circuit).

Next, an operation of the information processing apparatus will be described with reference to the flowchart shown in FIG. 2. Here, a case is described as an example in which the placement information, the acquisition condition information, etc. have been accumulated in advance in the placement information storage portion 102, the acquisition condition information storage portion 103, etc. in accordance with instructions given by the user or the like.

(Step S201) The information processing apparatus 1 (e.g., the image information configuration portion 105 or the like) assigns 1 to a counter n.

Step S202) The image information configuration portion 105 reads the shape information of the $n^{th}$ solid object from the shape information storage portion 101. The read shape information is temporarily stored in a storage medium such as a memory (not shown).

(Step S203) The surface information acquiring portion 104 assigns 1 to a counter m.

(Step S204) The image information configuration portion 105 reads the acquisition condition information corresponding to the $m^{th}$ surface of the $n^{th}$ solid object from the acquisition condition information storage portion 103. If there is no acquisition condition information, the procedure may move to Step S206, without performing the processing of Step S205.

(Step S205) The surface information acquiring portion 104 reads surface information that is the placement information that matches the acquisition condition information read in Step S204, from the placement information storage portion 102. The read surface information is temporarily stored in a storage medium such as a memory (not shown). If there is no matching surface information, reading is not performed.

(Step S206) The surface information acquiring portion 104 increments the counter m by 1.

(Step S207) The surface information acquiring portion 104 judges whether or not the $m^{th}$ surface is present in the $n^{th}$ solid object read in Step S202. If it is present, the procedure returns to Step S204. If it is not present, the procedure moves to Step S208.

(Step S208) The image information configuration portion 105 reads the object placement information of the $n^{th}$ solid object from the object placement information storage portion 107.

(Step S209) The image information configuration portion 105 configures image information of the $n^{th}$ solid object. Specifically, the image information configuration portion 105 performs rendering using the surface information temporarily stored in Step S205. For example, the image information configuration portion 105 configures image information in which the surface information temporality stored in Step S205 is successively placed on the surface of the solid object temporarily stored in Step S202. At that time, the surface information temporarily stored in Step S205 is placed on the surface to which the acquisition condition information used when acquiring that surface information corresponds.

(Step S210) The information processing apparatus 1 increments the counter n by 1.

(Step S211) The information processing apparatus 1 (e.g., the image information configuration portion 105 or the like) judges whether or not the $n^{th}$ solid object is present. If it is present, the procedure returns to Step S202. If it is not present, the procedure moves to Step S212.

(Step S212) The output portion 106 outputs the image information acquired in Step S209. Here, multiple pieces of image information acquired in multiple loops of Step S209 may be combined as needed, before performing the output. Alternatively, this combination may be performed by the image information configuration portion 105.

(Step S213) The modification instruction accepting portion 108 judges whether or not a modification instruction has been accepted. If it has been accepted, the procedure moves to Step S214. If it has not been accepted, the procedure moves to Step S215.

(Step S214) The object placement information updating portion 109 updates the object placement information stored in the object placement information storage portion 107, according to the modification instruction accepted in Step S213. The procedure then returns to Step S201.

(Step S215) The acquisition condition information accepting portion 110 judges whether or not acquisition condition information has been accepted. If it has been accepted, the procedure moves to Step S216. If it has not been accepted, the procedure moves to Step S217.

(Step S216) The acquisition condition information updating portion 111 updates the acquisition condition information stored in the acquisition condition information storage portion 103, using the acquisition condition information accepted in Step S215. The procedure then returns to Step S201.

(Step S217) The placement information accepting portion 114 judges whether or not placement information has been accepted. If it has been accepted, the procedure moves to Step S218. If it has not been accepted, the procedure returns to Step S213.

(Step S218) The placement information accumulating portion 115 updates the placement information stored in the placement information storage portion 102, using the placement information accepted in Step S217. The procedure then returns to Step S201.

Figure 2:
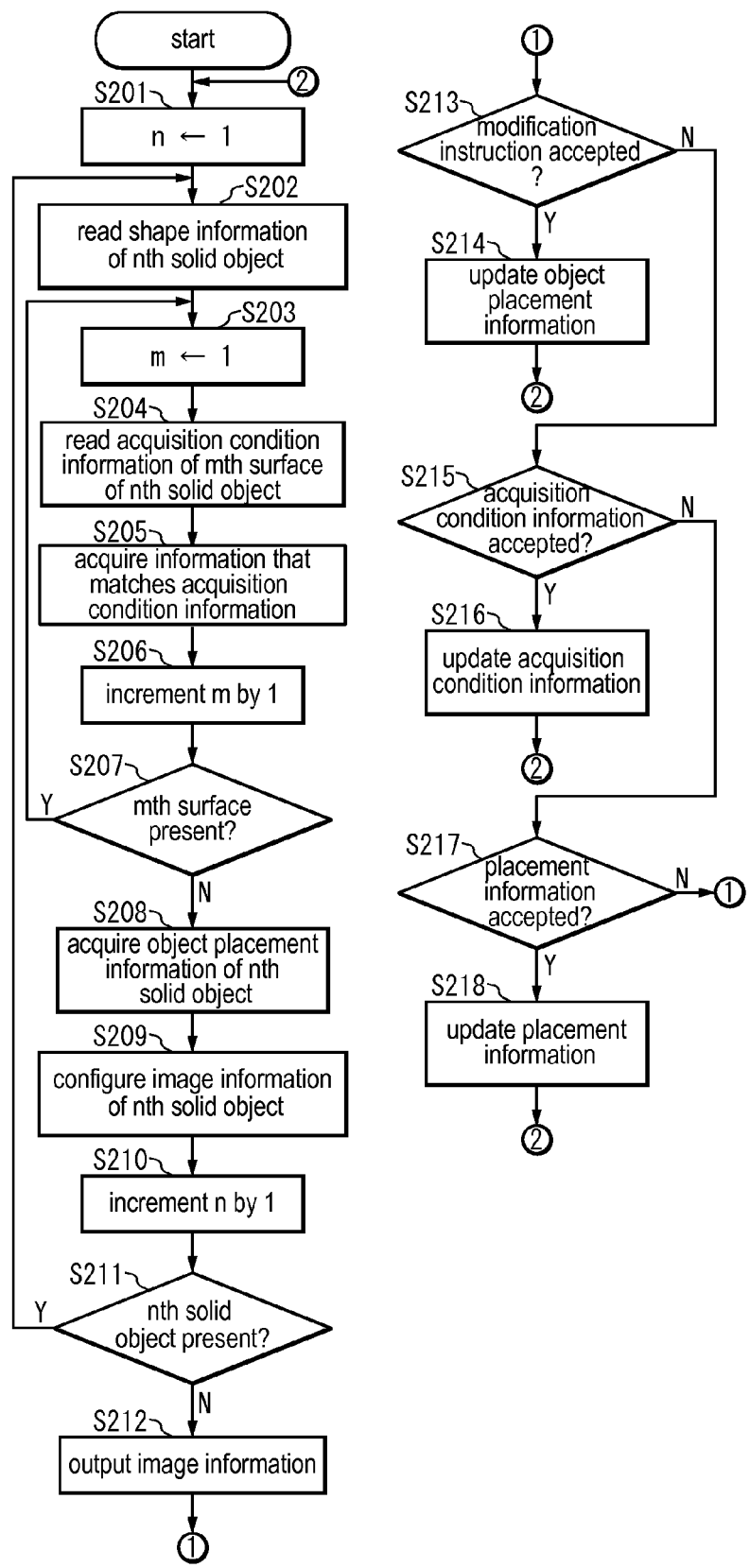
FIG. 2 is a flowchart illustrating an operation of the same information processing apparatus.

It is possible to adopt a configuration in which any solid object placed within a range that can be output is determined based on the object placement information and shape information stored in advance in the object placement information storage portion 107, for example, by performing an arithmetic operation in the processing or the like prior to Step S201 in the flowchart shown in FIG. 2, and the surface information, etc. is then acquired only for solid objects that can be output, and the image information of such solid object is configured.

Furthermore, it is possible to adopt a configuration in which the surface that will be at the rear side of a solid object is determined based on the shape information of the solid object by performing an arithmetic operation in advance, and the surface information of that surface that will be at the rear side is not acquired in Step S204 or S205.

Although image information of each solid object is configured successively after the surface information has been acquired for each solid object in the flowchart of FIG. 2, image information of all solid objects may be configured after the surface information is obtained for all solid objects. This eliminates the need to perform rendering, for example, for portions where there is an overlap between sold objects.

Note that the processing is ended by powering off or interruption for aborting the processing in the flowchart in FIG. 2.

Hereinafter, a specific operation of the information processing apparatus according to this embodiment will be described. Here, a case is described as an example in which a catalog on products is displayed by the information processing apparatus 1. Note that the lateral direction (width direction) in a virtual three-dimensional space is taken as the x-axis, and the longitudinal direction (height direction) is taken as the y-axis, and the depth direction is taken as the z-axis in the case described here. In addition, solid objects are a rectangular parallelepiped in the case described here.

FIG. 3 is a shape information management table for managing the shape information stored in the shape information storage portion 101 Here, it is assumed by way of example that the shape information has been created and accumulated in advance by a user or the like. The shape information management table includes the attributes "object ID", "size x", "size y", "size z", and "corresponding group". "object ID" is identification information for identifying a solid object. "size x" is the length in the x-axis direction, i.e., the width of the solid object in a virtual three-dimensional space. "size y" is the length in the y-axis direction, i.e., the height of the solid object in the virtual three-dimensional space. "size z" is the length in the z-axis direction, i.e., the depth of the solid object in the virtual three-dimensional space. Note that the unit or the like of the sizes may be any unit, including, for example, pixels. "corresponding group" is information for specifying the group of placement information to which the shape information of each record corresponds to. For example, 'product name "washing machine"' is information specifying the group of placement information having a product name tag whose element is "washing machine". When the placement information is not grouped, or when there is no need to specify the placement information corresponding to the shape information, this attribute may be omitted.

FIG. 4 shows an object placement information management table for managing the object placement information stored in the object placement information storage portion 107. Here, it is assumed by way of example that the object placement information has been created and accumulated in advance by a user or the like. The object placement information has the attributes "object ID", "coordinates (x, y, z)", and "rotation angle (x, y, z)". "object ID" is identification information for identifying a solid object, and corresponds to "object ID" of the shape information described above. "coordinates (x, y, z)" is information indicating the coordinates at which the solid object indicated by the "object ID" of the same record, and are described here as the coordinates of the center of the solid object. Here, it is assumed that the values of the coordinates represent the absolute coordinates in a virtual three-dimensional space. "rotation angle (x, y, z)" indicates the rotation angles when the x-axis, the y-axis, and the z-axis of the solid object are used as the rotation axis. When the respective values are (0, 0, 0), it is assumed that the width direction, the height direction, and the depth direction of the solid object are placed parallel to the x-axis direction, the y-axis direction, and the z-axis direction in the virtual three-dimensional space.

FIG. 5 shows an acquisition condition information management table for managing the acquisition condition information stored in the acquisition condition information storage portion 103. Here, it is assumed by way of example that the acquisition condition information management table has been created and accumulated in advance by a user or the like. The acquisition condition information management table has the attributes "front surface", "back surface", "top surface", "bottom surface", "left surface", and "right surface". "front surface", "back surface", "top surface", "bottom surface", "left surface", and "right surface" are pieces of acquisition condition information for specifying pieces of placement information respectively placed on the front surface, the back surface, the top surface, the bottom surface, the left surface, and the right surface of a solid object. For example, "specification" is acquisition condition information specifying placement information to which a specification tag, ordinarily displayed as "<specification>" is added. Further, "product name, color" is acquisition condition information specifying both of placement information to which a product name tag is added and placement information to which a color tag is added. Note that "–" indicates that there is no acquisition condition information. Here, it is assumed by way of example that the acquisition condition information is information specifying the tag of the placement information placed on each surface. The front surface, the back surface, the top surface, the bottom surface, the left surface, and the right surface of a solid object respectively indicate the front surface, the back surface, the top surface, the bottom surface, the left surface, and the right surface of a rectangular parallelepiped solid object indicated by the shape information as viewed from the direction facing the solid object when the solid object is placed in a default state, i.e., in a state in which the width direction, the height direction, and the depth direction of the solid object are aligned parallel to the x-axis, the y-axis, and the z-axis in a virtual three-dimensional space. Each of the surfaces constituting a solid object may be defined, for example, by the relative coordinates of the vertex of each of the surfaces. Here, all the solid objects indicated by the shape information are cubes, and therefore, the acquisition condition information is defined by one record of acquisition condition information for the surfaces constituting all the solid objects. However, the acquisition condition information may be set, for example, for each solid object, or each group of solid objects. In this case, an attribute (for example, "object ID" described above) for specifying a solid object or a group of solid objects to which acquisition condition information is applied may be added to the record of that acquisition condition information.

FIG. 6 shows the placement information stored in the placement information storage portion 102. Here, a case is described as an example in which the placement information constitutes XML format data. However, the placement information may not be XML format data, and may be data in a form that can be referred to, for example, for each item, attribute or the like. It is assumed that in the XML format data shown in FIG. 6, each piece of the placement information is a tagged data, i.e., data enclosed by a start tag and an end tag. Here, it is assumed by way of example that the placement information has been created and accumulated in advance by a user or the like. Here, it is also assumed that the placement information is grouped by product. That is, it is assumed that tagged data included in the rage delimited by a pair of product tags, i.e., "<product>" and "</product>" is placement information of one product. When information specifying a file or the like, including, for example, link information in included as the placement information, the information of the file specified by such information is acquired by the surface information acquiring portion 104 as the placement information.

For example, assuming that the user first gives an instruction to the information processing apparatus 1 to display a catalog on products, the image information configuration portion 105 of the information processing apparatus 1 first reads the shape information whose "object ID" is "OBJ1" shown in FIG. 3, and temporarily stores that information in a memory or the like.

Then, the surface information acquiring portion 104 acquires the placement information that is to be placed on the surfaces constituting the solid object whose shape information has been read by the image information configuration portion 105, i.e., the solid object whose "object ID" is "OBJ1" (hereinafter, referred to as "solid object "OBJ1""), using the acquisition condition information in the following manner.

First, the acquisition condition information of each of the surfaces constituting the solid object "OBJ1" is read from the acquisition condition information management table shown in FIG. 5. Then, from among the placement information shown in FIG. 6, the placement information that matches the acquisition condition information for each surface is successively read from the group of placement information specified by the value of the attribute "corresponding group" of the solid object "OBJ1" in the shape information management table shown in FIG. 3.

Figure 7:
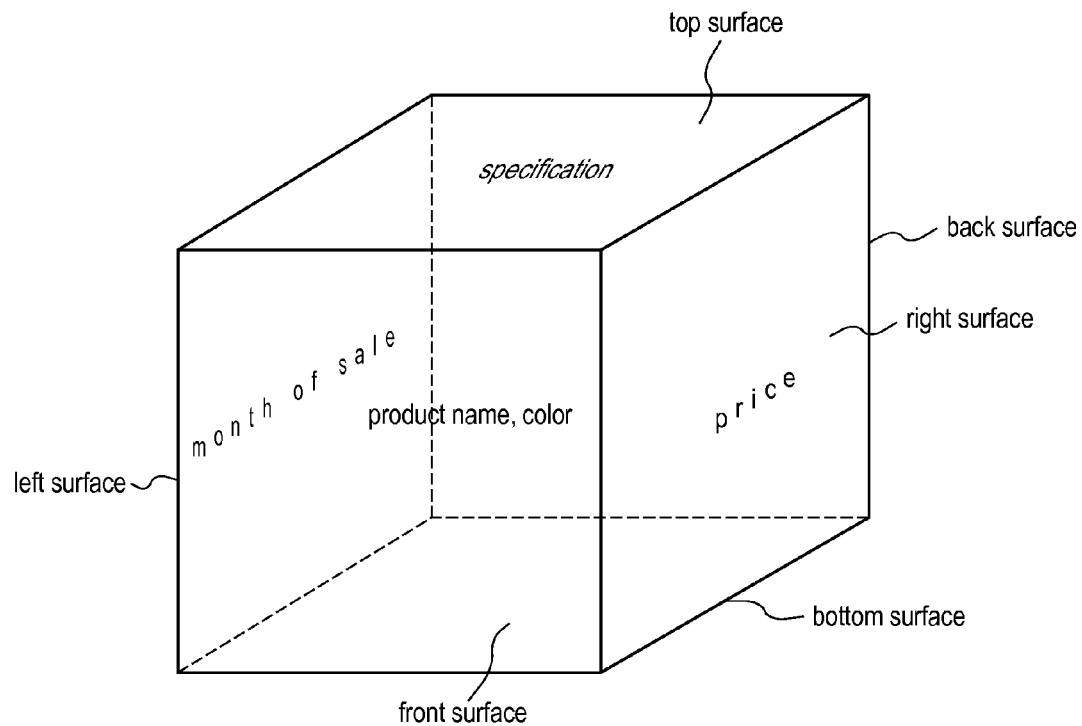
FIG. 7 is a schematic diagram for illustrating the same information processing apparatus.

FIG. 7 is a schematic diagram illustrating the relationship between the solid object "OBJ1" and the acquisition condition information of each surface.

Specifically, 'product name "washing machine"', which is the value of the "corresponding group" attribute of the solid object "OBJ1" is read from the shape information management table shown in FIG. 3. This value means that the group of placement information corresponding to the solid object "OBJ1" is a group including placement information in which the element of the product name tag is "washing machine". Next, since all the acquisition condition information shown in FIG. 5 is acquisition condition information common to all solid objects, "product name, color", which is the acquisition condition information of "front surface" in FIG. 5, is read first. Then, from among the placement information shown in FIG. 6, the information (element) to which "product name tag" is added, and the information (element) to which "color" tag is added are read from the group of placement information including the product name tag whose element is "washing machine". Here, since the group of placement information including the product name tag whose element is "washing machine" is the tagged information included in the range enclosed by the first pair of product tags in FIG. 6, the placement information to which a product name tag is added, which is the text information "washing machine", and the information specifying the image information "washing machine red.gif", "washing machine white.gif", and "washing machine black.gif", to which a "color" tag is added, from the range enclosed by these product tags. These "washing machine red.gif", "washing machine white.gif", and "washing machine black.gif" are the image information of a red washing machine, the image information of a white washing machine, and the image information of a black washing machine, respectively. Then, as for the information specifying the image information, the image information specified by such information is read from the placement information storage portion 102, or a storage medium or the like (not shown). Then, the read information is temporarily stored in a storage medium or the like (not shown) in association with "front surface" of the solid object "OBJ1".

Similarly, the placement information is acquired for the other surfaces constituting the solid object "OBJ1". For example, the pieces of text information "dry function" and "ionization function" are acquired for the top surface. Further, the text information "150,000 yen" is acquired for the right surface. Note that it is possible to adopt a setting in which the text information of the title of the tags of the placement information, including, for example, "product name", "specification", "color", "price" and the like, is acquired along with these acquired pieces of placement information, and is accumulated together with the acquired placement information. The processing of acquiring the acquisition condition information is not performed for the surfaces for which there is no acquisition condition information.

Upon completion of the processing of acquiring the acquisition condition information for all the surfaces, the image information configuration portion 105 reads the object placement information corresponding to the solid object "OBJ1" from the object placement information management table shown in FIG. 4. Specifically, the image information configuration portion 105 reads "(100, 300, 100)", which is the value of "coordinates (x, y, z)" of the record whose "object ID" is "OBJ1", and "(0, 0, 0)", which is the value of "rotation angle (x, y, z)". Then, the image information configuration portion 105 configures image information of the solid object "OBJ1" that is indicated by the shape information of the solid object "OBJ1". At this time, the placement, or more specifically, the position and the orientation of the solid object "OBJ1" are set as indicated by the object placement information read from the object placement information management table. Further, on each of the surfaces of the solid object "OBJ1", the surface information, which is the placement information that the surface information acquiring portion 104 acquired using the acquisition condition information specified for that surface is placed. Here, it is assumed that the axis of coordinates is set such that a projection drawing of the solid object is configured.

Similarly, the image information configuration portion 105 acquires the surface information for the other solid objects, and configures image information of the solid objects.

Figure 8:
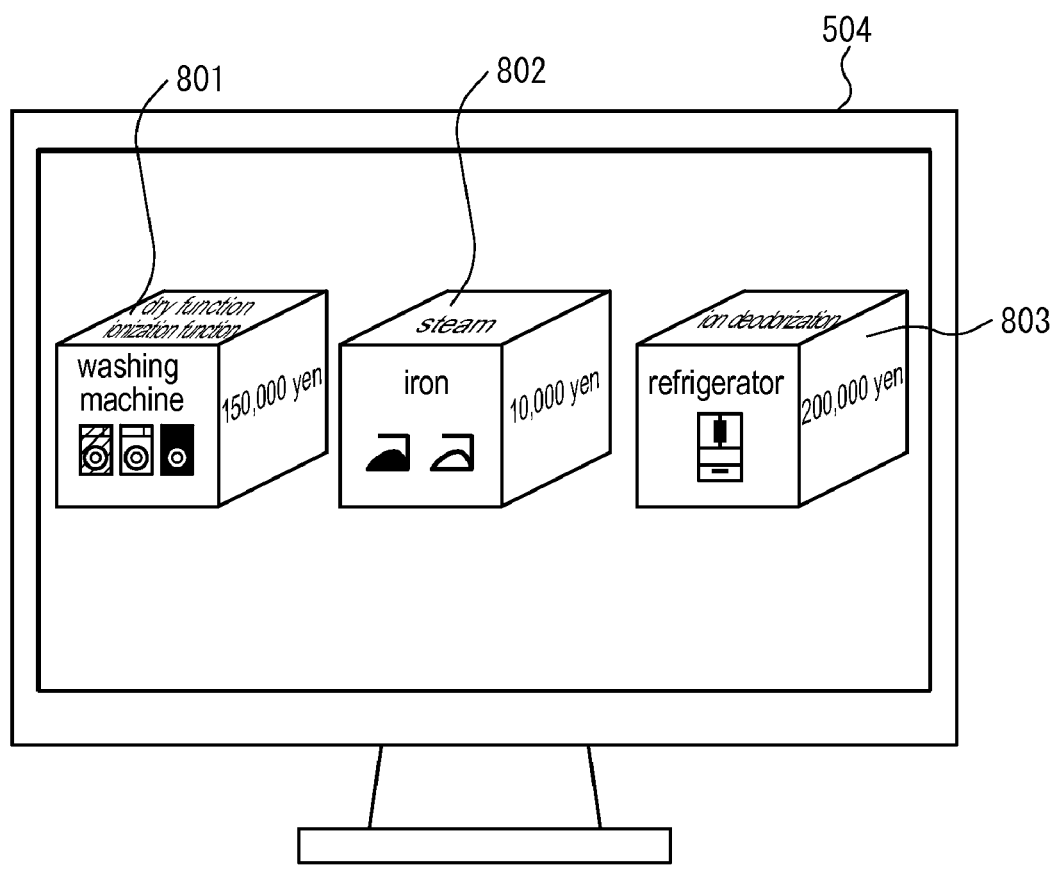
FIG. 8 is a diagram showing a display example of the same information processing apparatus.

Then, the image information configuration portion 105 combines the configured pieces of image information of the multiple solid objects, and the output portion 106 outputs the image information combined by the image information configuration portion 105. Here, the output portion 106 is connected to a monitor 504, and displays the combined image information of the solid objects on that monitor. A display example is shown in FIG. 8. It is assumed that in FIG. 8, a solid object 801 is the solid object "OBJ1", a solid object 802 is a solid object "OBJ2", and a solid object 803 is a solid object "OBJ3". Note that the values of coordinates, the positions of the solid objects, or the like shown in the drawings in this embodiment are explanatory, and are not precisely depicted according to the actual size or the like. The same applies to other embodiments. As shown in FIG. 8, each of the solid objects corresponds to a product. The color-specific image, the specification, the price and the like of each product are respectively displayed on the surface of that solid object, so that the correspondence between each product and the information relating to that product, such as the specification, can be readily understood.

Next, it is assumed that the user manipulates the mouse to give an instruction to move the position of the solid object 801, which is the solid object "OBJ1", displayed on the monitor 504, and to rotate the solid object 801 about the z-axis. It is assumed that through this manipulation, the modification instruction accepting portion 108 has accepted (100, 400, 100) as the information of the coordinates after the movement and (0, 90°, 0) as the information of the rotation angle after the rotation for the solid object "OBJ1". This instruction is, for example, an instruction to move the solid object "OBJ1" downward by "100", and to rotate the solid object "OBJ1" counterclockwise by 90°. The object placement information updating portion 109 updates, in this case, overwrites the object placement information of the solid object "OBJ1" stored in the object placement information storage portion 107, using the accepted information of the coordinates and the rotation angle. The updated object placement information management information is shown in FIG. 9.

Figure 10:
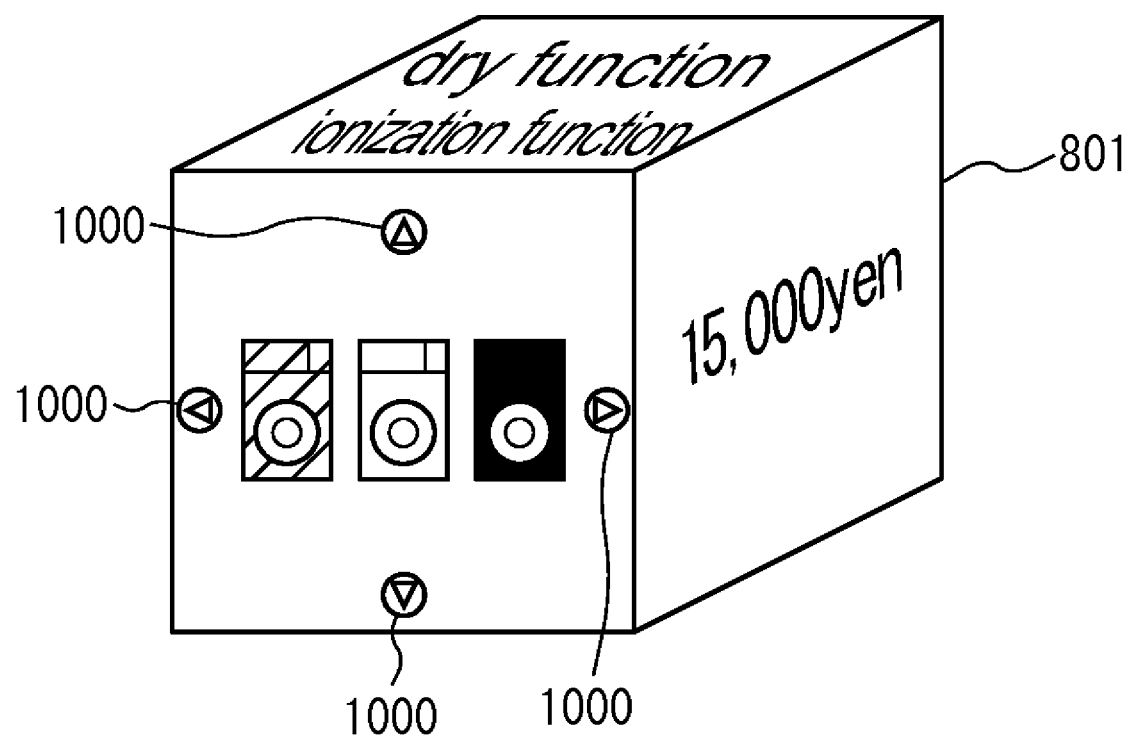
FIG. 10 is a diagram for illustrating a modification of the same information processing apparatus.

It is possible to adopt a configuration as shown in FIG. 10 in which an area where an event for rotating the solid object is generated is set on the displayed surfaces of a solid object, buttons 1000 are displayed in this area so that a command or the like for rotating the solid object is generated when this area is depressed with a pointer or the like, and the command is passed to the modification instruction accepting portion 108. Here, for example, a command for rotating the solid object 801 clockwise by 90° may be generated when the buttons 1000 are clicked. Alternatively, when the vicinity of a side is clicked, a command for rotating the solid object about an axis parallel to the clicked side may be generated.

Figure 11:
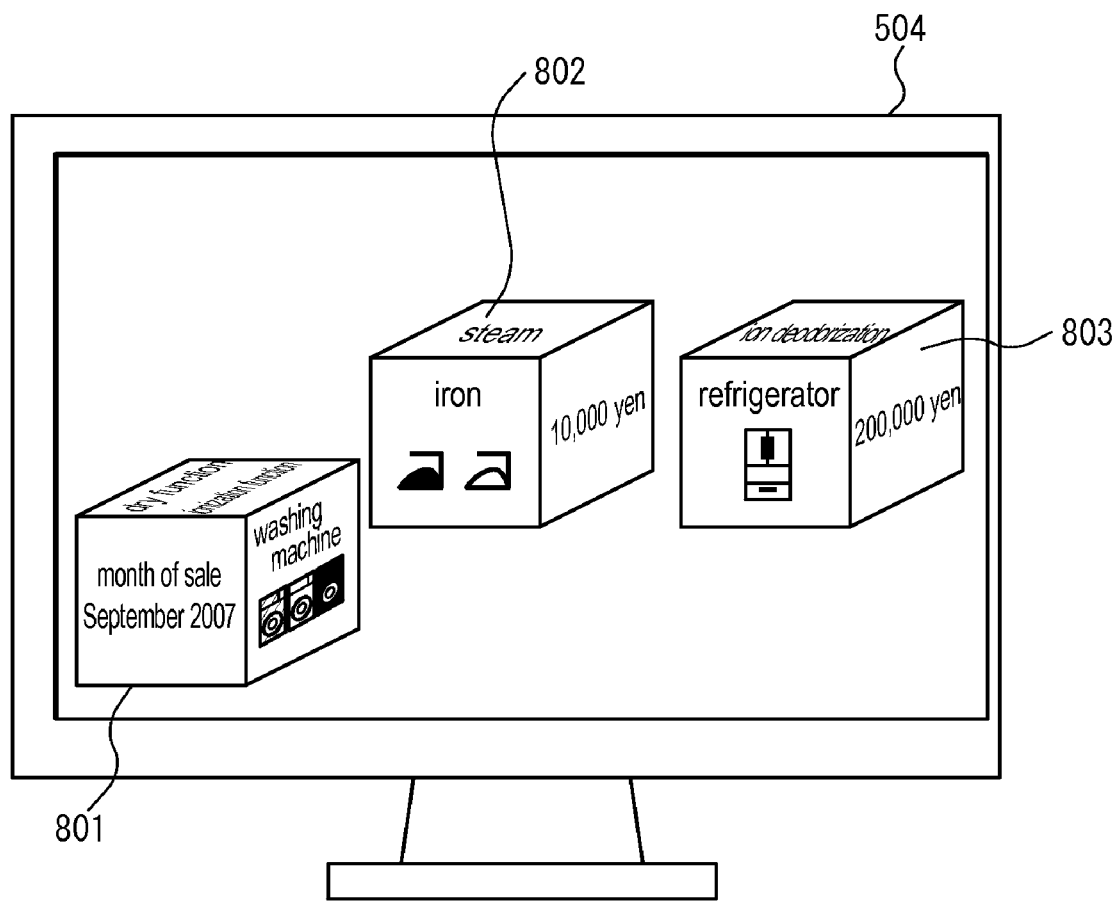
FIG. 11 is a diagram showing a display example of the same information processing apparatus.

When the modification instruction accepting portion 108 has accepted the modification instruction, and the object placement information has been updated according to that modification instruction, the image information configuration portion 105 configures image information using the modified object placement information in the same manner as described above. At this time, the surface information acquired by the surface information acquiring portion 104 may be acquired again, or the most recently acquired surface information may be used as it is. Alternatively, the image information of a solid object whose placement has not been modified may or may not be configured again. Then, the output portion 106 displays the configured image information on the monitor 504 as shown in FIG. 11.

Further, it is assumed that the user manipulates the keyboard or the like in the state shown in FIG. 8 to perform input to change the acquisition condition information of "right surface" among the acquisition condition information of the solid object into "manufacturer". The acquisition condition information updating portion 111 updates, in this case, overwrites the acquisition condition information stored in the acquisition condition information storage portion 103, using the input acquisition condition information. The updated acquisition condition information is shown in FIG. 12.

Figure 13:
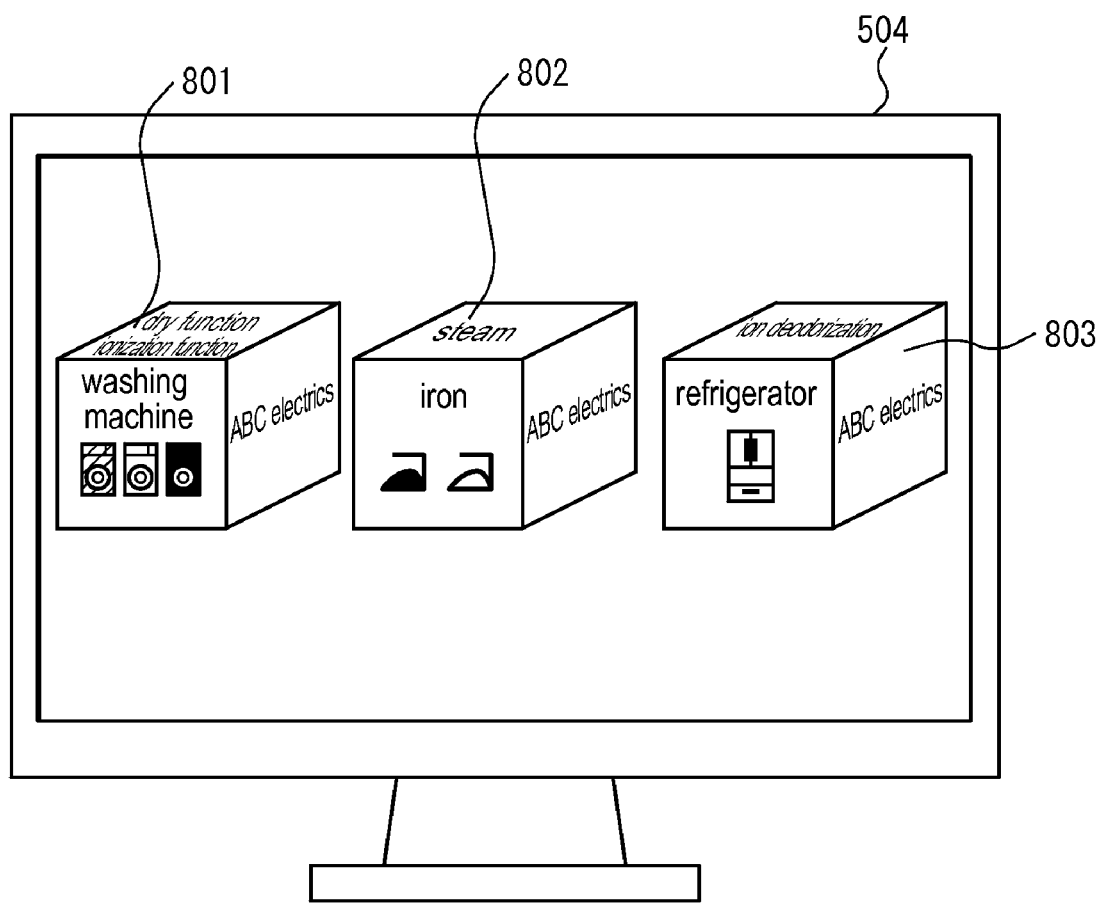
FIG. 13 is a diagram showing a display example of the same information processing apparatus.

When the acquisition condition information accepting portion 110 has accepted the acquisition condition information, and the acquisition condition information updating portion 111 has updated the acquisition condition information, the surface information acquiring portion 104 reacquires the surface information of each solid object, using the updated acquisition condition information. Here, the surface information acquiring portion 104 acquires the element of the tag "manufacturer" as the surface information. Then, the image information configuration portion 105 configures image information of the solid object, using the surface information acquired by the surface information acquiring portion 104, and the shape information and the object placement information. Then, the output portion 106 displays the configured image information on the monitor 504 as shown in FIG. 13.

Further, it is assumed that the user manipulate the keyboard or the like in the state shown in FIG. 8 to give an instruction to modify a part of the placement information shown in FIG. 6. For example, assuming that the user has given an instruction to change the attribute value of the price tag of the product whose product name is "refrigerator" to "140,000 yen", the placement information accepting portion 114 accepts the instruction to change the attribute value of the price tag of the product whose product name is "refrigerator" to "140,000 yen" and the placement information accumulating portion 115 updates the placement information stored in the placement information storage portion 102 according to the input modification instruction.

Figure 14:
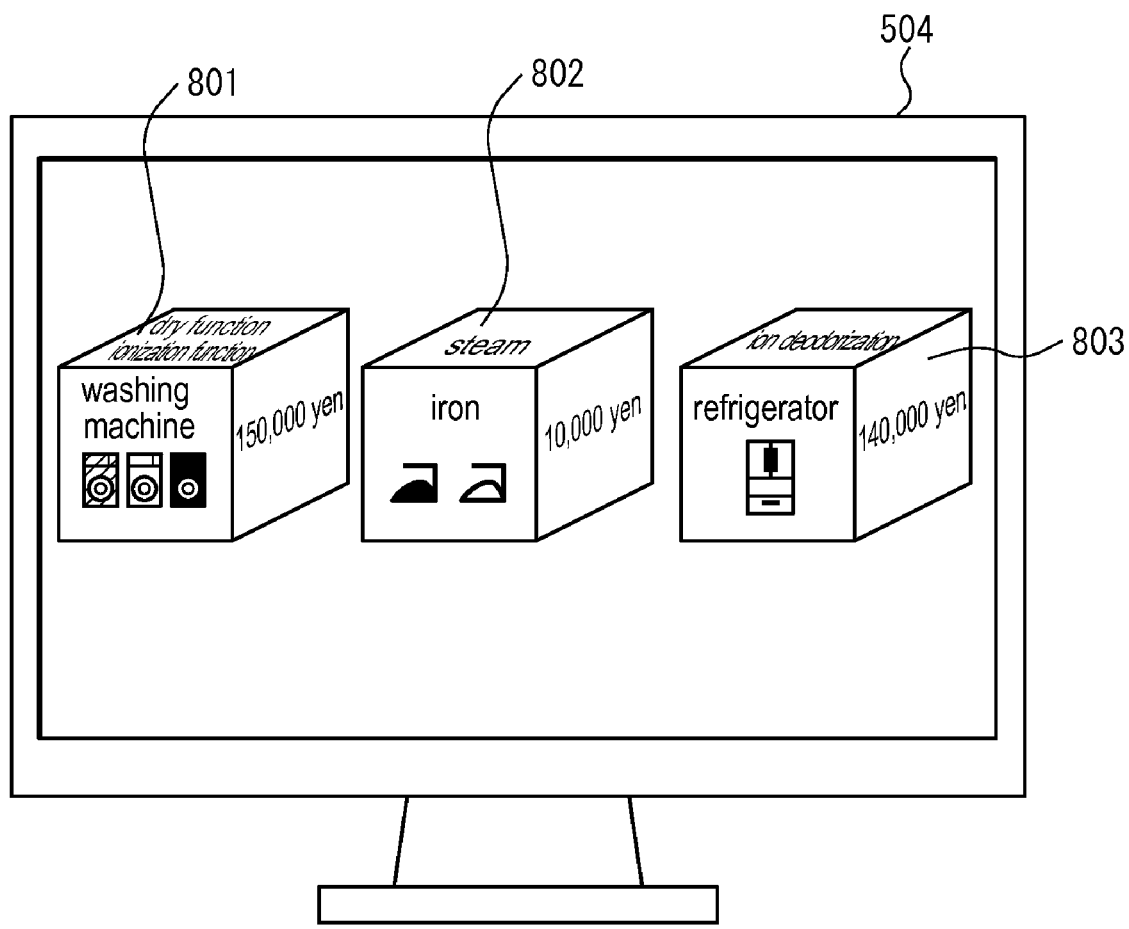
FIG. 14 is a diagram showing a display example of the same information processing apparatus.

When the placement information accepting portion 114 has accepted the modification instruction of the placement information, and the placement information accumulating portion 115 has updated the placement information, the surface information acquiring portion 104 reacquires the surface information of each solid object, using the updated placement information. Then, the image information configuration portion 105 configures the image information of the solid object, using the surface information acquired by the surface information acquiring portion 104, and the shape information and the object placement information. Then, the output portion 106 displays the configured image information on the monitor 504 as shown in FIG. 14.

Here, it is assumed that multiple files including placement information as shown in FIG. 6 are stored in the placement information storage portion 102, for example, and the file name of the file of the placement information shown in FIG. 6 is "catalog.xml". Then, it is assumed that acquisition condition information as shown in FIG. 15 is specified as the acquisition condition information of a solid object "OBJ5" only for the front surface and the right surface. Note that FIG. 15 is a management table similar to the acquisition condition information management table shown in FIG. 12 in which the attribute "object ID" specifying a solid object is provided. In the acquisition condition information here, 'select""' is an item for which the placement information that is to be acquired (in this case, the information specifying a tag), 'from""' is a group of placement information including the placement information that is to be acquired (here, the information specifying a file), and 'where""' is information specifying the condition for acquiring the placement information. For example, 'select "product name" from "catalog.xml" where "price ≦50,000 yen"', which is the acquisition condition information of the front surface, is information instructing to acquire the element of the product name tag of a product included in the file "catalog.xml" and whose attribute value of the price tag is 50,000 yen or less. Similarly, the acquisition condition information of the right surface is information instructing to acquire the attribute value of the price tag of the same product.

Figure 16:
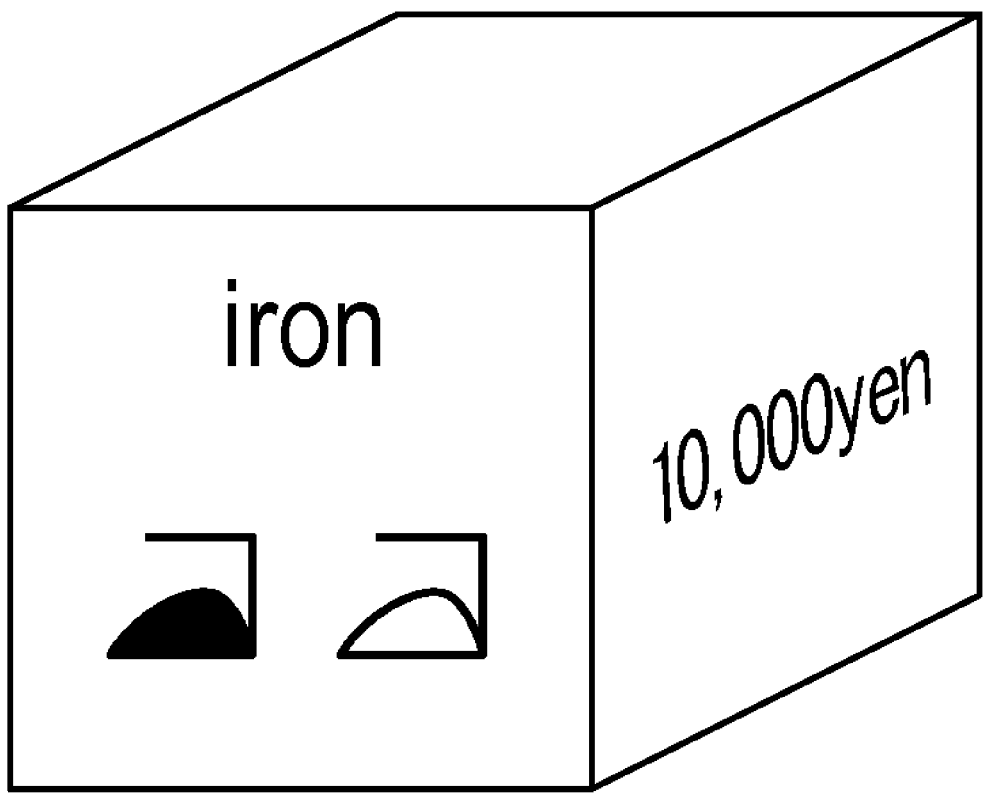
FIG. 16 is a diagram showing a display example of the same information processing apparatus.

When such acquisition condition information is set for the surfaces of the solid object, the surface information acquiring portion 104 acquires the element of the product name tag of the product that is included in the file "catalog.xml" and whose attribute value of the price tag is 50,000 yen or less as the surface information of the front surface of the solid object "OBJ5". Here, the value of the price tag of the product whose value of the product name tag is "iron" is 10,000 yen, and therefore, "iron", which is the value of the product name tag of this product is read from the file "catalog.xml" as the surface information of the front surface of the solid object "OBJ1". Similarly, "10,000 yen", which is the value of the price tag of the same product, is read as the surface information of the right surface. A display example of the solid object "OBJ5" that has been configured using this surface information is shown in FIG. 16.

It is assumed that when display of the solid object "OBJ1" as shown in FIG. 8 is performed, multiple pieces of placement information, namely, "<price>130,000 yen</price>", "<price>140,000 yen</price>", and "<price>150,000 yen</price>", for example, are provided as the placement information of "washing machine" to which the price tag is added in the placement information shown in FIG. 6. Further, it is assumed that the attribute value of the right surface in the acquisition condition information shown in FIG. 5 is 'AVE price'" as shown in FIG. 17. It is assumed that this 'AVE price'" is an arithmetic formula meaning that when there are multiple pieces of placement information to which a price tag is added, the average of their attribute values is acquired. In such a case, as described above, when acquiring the surface information of the right surface of the solid object "OBJ1", the surface information acquiring portion 104 acquires "140,000 yen" which is the average of all of the values of the price tag of the products whose product name tag corresponding to the solid object "OBJ1" are "washing machine". This makes it possible to display the result of an arithmetic operation performed using the placement information on the solid objects.

As has been described above, according to this embodiment, correlated pieces of information are output such that they are placed on the surfaces of the solid objects, and therefore, the correlation between pieces of information can be displayed in a clearly understandable manner. Furthermore, since the placement of the solid objects is made modifiable, the output of information can be manipulated interactively, thereby improving the convenience, and realizing user-participatory information presentation.

Furthermore, the information processing apparatus according to this embodiment can be used as a new user interface model, a new file system, or a new widow system capable of outputting information that may be defined in terms of various aspects.

Furthermore, the surface information placed on the surfaces of a solid object is acquired from the placement information, using the acquisition condition information, so that update such as deletion, addition, and modification of the information can be readily performed by modifying the acquisition condition information, the placement information, etc. Also, the information displayed on a solid object in association with that solid object can be dynamically modified according to the acquisition condition.

Since a retrieval formula or an arithmetic formula is used as the acquisition condition information, the placement information can be processed as necessary for output, making it possible to increase the flexibility for acquiring the surface information.

In the case described in the above-described embodiment, the shape information corresponding to the placement information is stored in advance in the shape information storage portion 101. However, according to the present invention, it is possible to adopt a configuration in which the image information configuration portion 105, a processing portion (not shown), or the like configures shape information corresponding to the placement information accepted by the placement information accepting portion 114, and image information for output is configured using the configured shape information. For example, the image information configuration portion or a processing portion (not shown) may acquire the number of pieces of information corresponding to the number of pieces of surface information placed on a solid object from the placement information accepted by the placement information accepting portion 114. Then, when the number of the acquired information is n (n is an integer of 2 or more), the shape information of an n-hedron (e.g., a regular n-hedron) may be created automatically using the value n. The algorithm or the like for forming such a regular n-hedron may be accumulated in a storage medium or the like (not shown) in advance, and may be read as needed. The same applies to other embodiments.

Embodiment 2

An information processing apparatus according to this embodiment has a configuration in which the solid objects have a hierarchical relationship with each other in the above-described embodiment, and even if the placement of a solid object at a higher level in hierarchy is modified, the placement of a solid object at a lower level in hierarchy that directly belongs to that solid object whose placement has been modified such that the relative placement relationship of the solid object at a lower level in hierarchy with the solid object at a higher level in hierarchy is maintained.

Figure 18:
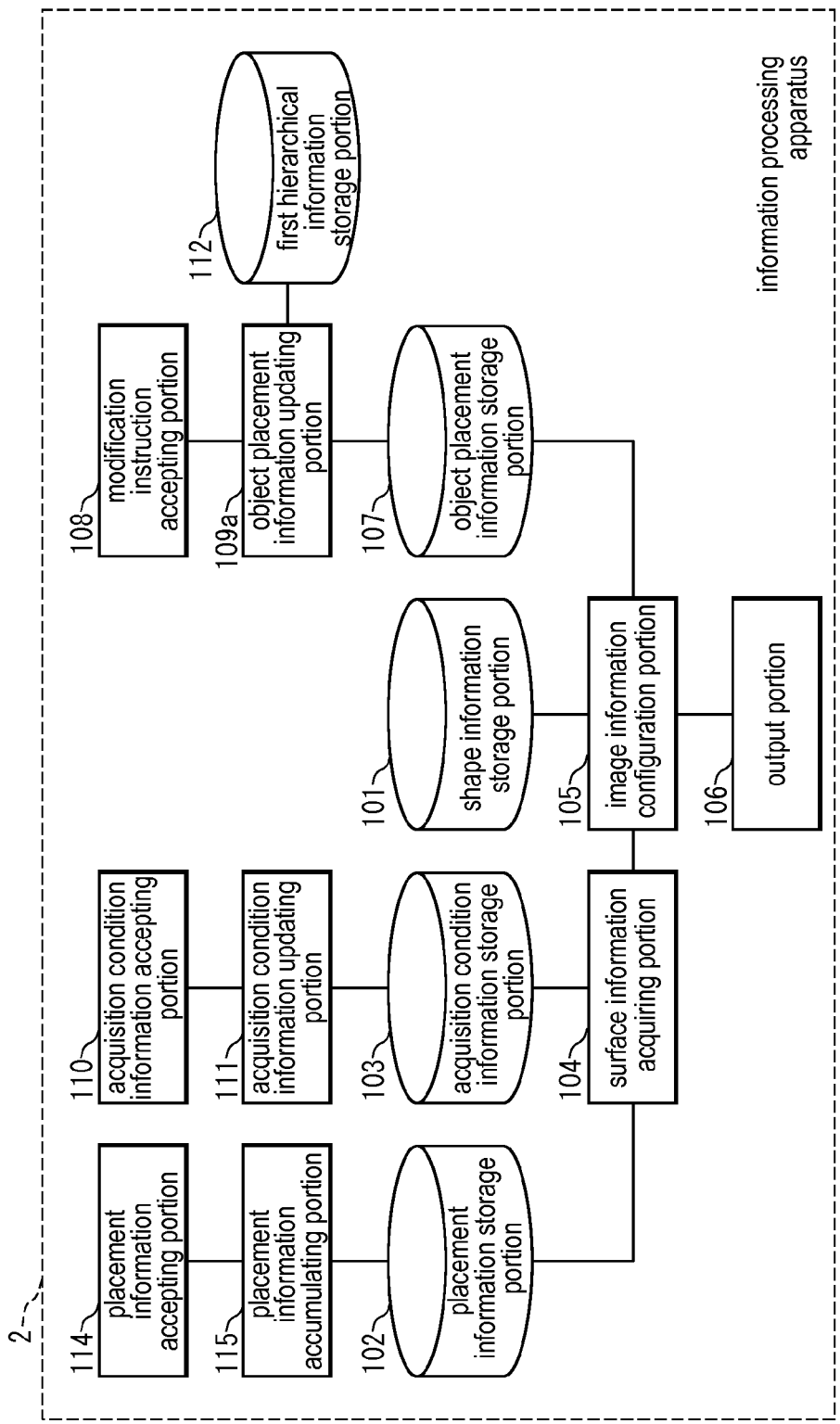
FIG. 18 is a block diagram showing an information processing apparatus according to Embodiment 2.

FIG. 18 is a block diagram showing the configuration of an information processing apparatus according to this embodiment. The information processing apparatus 2 has a configuration in which a first hierarchical information storage portion 112 is further included in the information processing apparatus of Embodiment 1 above, and an object placement information updating portion 109a is included in place of the object placement information updating portion 109 Note that the configuration is the same as that of Embodiment 1 described above except for the object placement information updating portion 109a and the first hierarchical information storage portion 112, and therefore, a detailed description thereof has been omitted.

First hierarchical information, which is hierarchical information specifying the hierarchical relationship between solid objects may be stored in the first hierarchical information storage portion 112. The first hierarchical information is, for example, information or the like specifying a solid object to which each solid object directly belongs and that is at a higher or a lower level in hierarchy than the level of that solid object by a predetermined number of levels. When solid objects are organized in a tree structure, information indicating the pass or node of each solid object may be used as the first hierarchical information. The first hierarchical information storage portion 112 is preferably a nonvolatile recording medium, but may be implemented by a volatile recording medium. Note that the first hierarchical information may be configured and accumulated in any manner. A case is described in this embodiment in which the first hierarchical information stored in the first hierarchical information storage portion 112 has been created by a user in advance. However, it is possible to adopt a configuration in which first hierarchical information indicating that a solid object determined to be located within another single solid object is at a lower level in hierarchy than that of the other single solid object containing that solid object is configured, using the object placement information stored in the object placement information storage portion 107, for example, by a processing portion (not shown) or the object placement information updating portion 109, and the first hierarchical information is accumulated in the first hierarchical information storage portion 112.

According to the modification instruction for the placement of the solid object that has been accepted by the modification instruction accepting portion 108, the object placement information updating portion 109a modifies the object placement information of a solid object located at a lower level in hierarchy than the solid object to which that modification instruction is targeted in such a manner that the relative placement relationship with the solid object to which the modification instruction is targeted will not be changed, using the first hierarchical information to change. For example, when the modification instruction accepting portion 108 has accepted an instruction to modify the placement for a single solid object in a case where the object placement information specifying the position, the orientation, and the like of the solid objects stored in the object placement information storage portion 107 is specified using absolute coordinates in a virtual three-dimensional space, the object placement information updating portion 109a modifies the object placement information of the solid object for which it has accepted the modification instruction according to the modification instruction as in the above-described embodiment. The object placement information updating portion 109a also detects a solid object located at a lower level in hierarchy than that of the solid object for which the modification instruction has been accepted, from the first hierarchical information, calculates object placement information also for the detected solid object so that the relative positional relationship, including, for example, relative coordinates or orientation, with the solid object for which the modification instruction has been accepted, will not be changed, and updates the object placement information of the solid object at a lower level in hierarchy, using the object placement information obtained by calculation. Note that the rest of the configuration is the same as that of the object placement information updating portion 109 above-described, and therefore, a description thereof has been omitted. Ordinarily, the object placement information updating portion 109a may be implemented by an MPU, a memory or the like. The processing procedure of the object placement information updating portion 109a is ordinarily implemented using software, and that software is recorded in a recording medium such as a ROM. However, the processing procedure may be implemented using hardware (a dedicated circuit).

In this embodiment, a folder object, which is a solid object indicating a hierarchical relationship between multiple solid objects, may be provided as the solid object. Surface information as described above may not be acquired for this folder object, and image information of a pre-specified solid object may be configured. The shape information of this folder object is stored in the shape information storage portion 101, for example.

In this embodiment, a solid object at a lower level in hierarchy is preferably placed within a solid object at a higher level in hierarchy to which it directly belongs. Specifically, it is preferable that such placement information that a solid object at a lower level in hierarchy is placed within a solid object at a higher level in hierarchy to which it directly belongs is accumulated in the object placement information storage portion 107. This makes is possible to visually recognize the hierarchical relationship between the solid objects.

In this embodiment, in order to make another solid object placed within a solid object visually recognizable in an image or the like output from the output portion 106, it is preferable that the interior of at least a solid object within which another solid object is placed is made transparent so that the interior thereof is visible, for example, by providing the image information configured from that solid object with transparency information, configuring image information constituted only by a frame such as a wire frame, or rendering image information in which the solid objects are layered on each other so that the interior thereof are transparent. Such transparency information or the like may be specified in the shape information or the like in advance. Alternatively, it is possible to adopt a configuration in which the image information configuration portion 105 is allowed to refer to the first hierarchical information stored in the first hierarchical information storage portion 112 when configuring the image information, determines the hierarchical relationship between the solid objects from that first hierarchical information, and forms an image by determining the transparency of the solid object containing a solid object at a lower level in hierarchy, based on the result of the determination.

Figure 19:
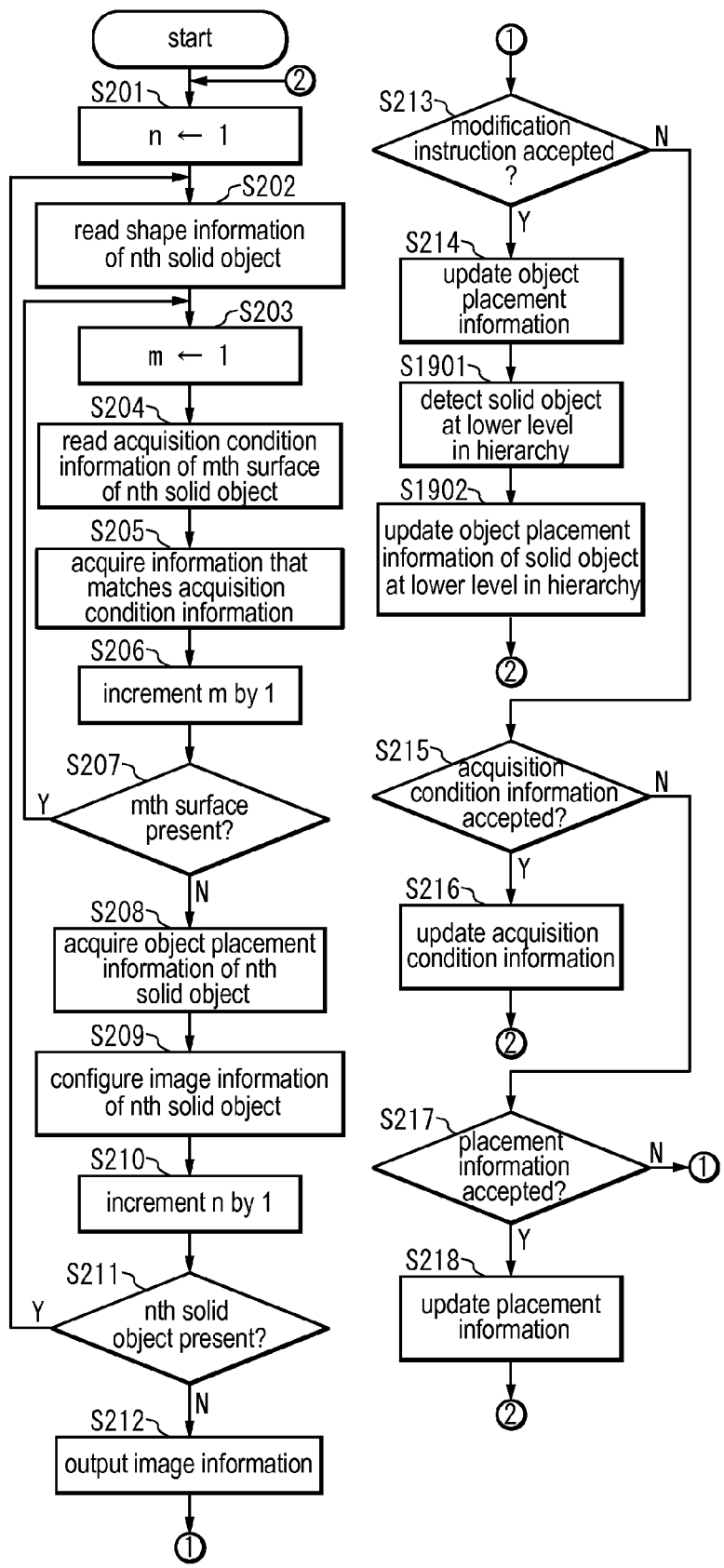
FIG. 19 is a flowchart illustrating an operation of the same information processing apparatus.

Next, an operation of the information processing apparatus 2 according to this embodiment will be described with reference to the flowchart in FIG. 19. In FIG. 19, the same reference numerals as those in those in FIG. 2 denote similar or corresponding processing.

(Step S1901) The object placement information updating portion 109 detects a solid object at a lower level in hierarchy than that of the solid object corresponding to the modification instruction accepted in Step S213, using the first hierarchical information stored in the first hierarchical information storage portion 112.

(Step S1902) According to the modification instruction accepted in Step S213, the object placement information updating portion 109 modifies the object placement information of the solid object detected in Step S1901 such that the relative placement with respect to the solid object specified by that modification instruction will not be changed, i.e., the relative placement relationship will be maintained. Then, the modified object placement information is accumulated in the object placement information storage portion 107. The procedure then returns to Step S201.

Note that the processing is ended by powering off or interruption for aborting the processing in the flowchart in FIG. 19.

Next, a specific operation of the information processing apparatus 2 according to this embodiment will be described.

FIG. 20 is a shape information management table, similar to FIG. 3, for managing the shape information stored in the shape information storage portion 101. Here, it is assumed that the shape information management table further has the attribute "corresponding acquisition condition", and solid objects associated with pieces of the shape information whose attribute values of "corresponding acquisition condition" match are associated with the same acquisition condition information.

FIG. 21 is an object placement information management table, similar to FIG. 4, for managing the object placement information stored in the object placement information storage portion 107.

FIG. 22 shows an acquisition condition information management table, similar to FIG. 5, for managing the acquisition condition information stored in the acquisition condition information storage portion 103. Here, it is assumed that the acquisition condition information management table has the "corresponding acquisition condition" attribute, which corresponds to "corresponding acquisition condition" of the shape information management table described above, and acquisition condition information that the value of this attribute match is applied to each piece of shape information.

FIG. 23 shows placement information, similar to FIG. 6, that is stored in the placement information storage portion 102, Here, it is assumed that tagged data in the range delimited by catalog tags is also considered as one group of placement information. That is, it is assumed that groups of placement information are nested.

FIG. 24 is a first hierarchical information management table for managing the first hierarchical information stored in the first hierarchical information storage portion 112. The first hierarchical information management table has the attributes "object ID" and "upper level in hierarchy". "object ID" is an attribute corresponding to "object ID" of the shape information management table shown in FIG. 20. "higher level in hierarchy" is an attribute indicating "object ID" of a solid object located at a higher level in hierarchy than that of the solid object corresponding to the "object ID" attribute of the same record. Here, it is assumed that the value is "−" when there is no higher level in hierarchy.

First, when the user gives an instruction to the information processing apparatus 2 to display a catalog on products, the surface information corresponding to the acquisition condition information specified for the solid objects is acquired, and the image information of each solid object is configured and output, in the same manner as in the specific example of Embodiment 1 described above. Here, it is assumed by way of example that when acquiring the surface information for each solid object, the surface information acquiring portion 104 retrieves the acquisition condition information having the same value of "corresponding acquisition condition", using the value of "corresponding acquisition condition" included in the shape information of each solid object as a retrieval key, and acquires the surface information of each solid object from the placement information storage portion 102, using the acquisition condition indicated by the acquisition condition information obtained through the retrieval. For example, for a solid object corresponding to the shape information whose "corresponding acquisition condition" is "product", the surface information acquiring portion 104 acquire the surface information of each surface, using the acquisition condition information of a record whose "corresponding acquisition condition" is "product" in the acquisition condition information management table shown in FIG. 22. Here, it is also assumed that when configuring the image information of a solid object corresponding to shape information whose "corresponding acquisition condition" is "catalog", the image information configuration portion 105 forms an image such that the interior of the solid object is transparent. For a solid object corresponding to shape information whose "corresponding group" attribute is 'catalog name "electric appliance"' in the shape information management table shown in FIG. 20, the surface information that matches the acquisition condition is acquired from a group of placement information that includes a catalog name tag having the element "electric appliance" among the placement information shown in FIG. 23.

Figure 25:
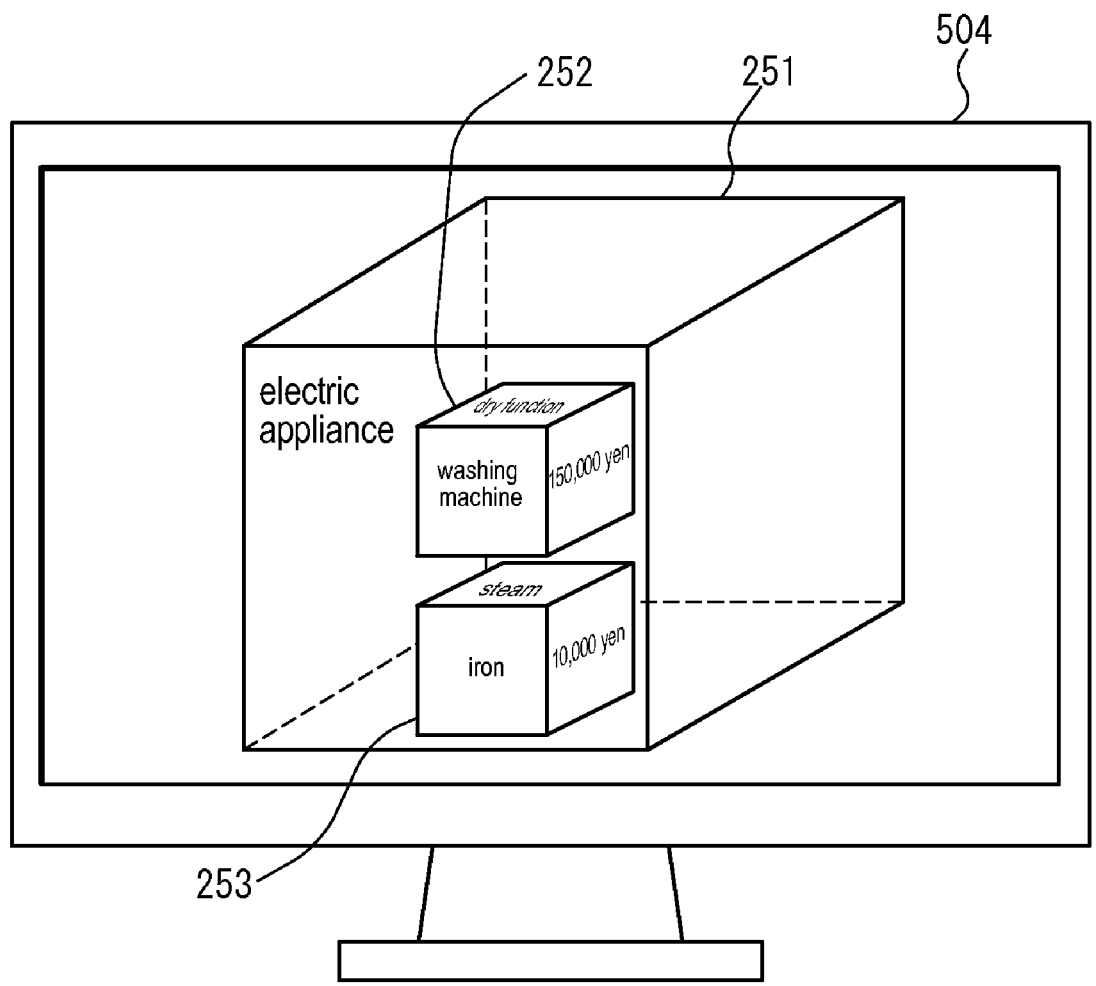
FIG. 25 is a diagram showing a display example of the same information processing apparatus.

A display example of an image formed by the information processing apparatus 2 in this manner using the monitor 504 is shown in FIG. 25. In FIG. 25, solid object "OBJ11" is a solid object 251, solid object "OBJ12" is a solid object 252, and solid object "OBJ13" is a solid object 253.

Next, it is assumed that the user manipulates the mouse to give an instruction to move the position of the solid object 251, which is the solid object "OBJ11", displayed on the monitor 504, and to rotate the solid object 251 about the z-axis. It is assumed that through this manipulation, the modification instruction accepting portion 108 has accepted (350, 300, 300) as the information of the coordinates after the movement and (0, −90°, 0) as the information of the rotation angle after the rotation for the solid object "OBJ11". This instruction is, for example, an instruction to move the solid object "OBJ11" to the right by "50", and to rotate the solid object "OBJ11$^5$" clockwise by 90°. The object placement information updating portion 109a updates, in this case, overwrites the object placement information of the solid object "OBJ11" stored in the object placement information storage portion 107, using the accepted information of the coordinates and the rotation angle.

Further, the object placement information updating portion 109 retrieves a solid object at a lower level in hierarchy than that of the solid object "OBJ11" for which the modification instruction has been accepted by the modification instruction accepting portion 108, from the first hierarchical information management table shown in FIG. 24, stored in the first hierarchical information storage portion 112. Specifically, the object placement information updating portion 109 retrieves a record whose attribute value of "higher level in hierarchy" in the first hierarchical information management table matches "OBJ11", which is "object ID" of the solid object for which the modification instruction has been accepted, and detects a solid object corresponding to the shape information having the value of "object ID" that matches the attribute "object ID" of the record obtained through the retrieval, as the solid object at a lower level in hierarchy. Here, the solid objects whose values of "object ID" are "OBJ12" and "OBJ13" are determined to be the solid objects at a lower level in hierarchy. The object placement information updating portion 109 reads the object placement information of the solid objects whose value of "object ID" are "OBJ12" and "OBJ13" from the object placement information storage portion 107, and modifies the object placement information of the solid objects, which are "OBJ12" and "OBJ13", such that the relative placement with respect to the solid object "OBJ11" after the placement modification will not be changed from the relative placement relationship before the placement modification, using the modification instruction accepted for the solid object "OBJ11". Here, the absolute coordinates specifying the position of each solid object are calculated by modifying each solid object by an amount of the difference by which the absolute coordinates indicating the position of the solid object "OBJ11" has been changed by the modification instruction, and further rotating each solid object about the rotation axis of the solid object "OBJ11" by an amount of the difference by which the rotation angle of the solid object "OBJ11" has been changed by the modification instruction. Furthermore, the rotation angle that is the same as the amount by which the rotation angle of the solid object "OBJ11" has been changed by the modification instruction is acquired as the rotation angle of each solid object. Then, the object placement information of the solid object "OBJ12"

and the solid object "OBJ13" stored in the object placement information storage portion 107 is updated using the acquired absolute coordinates and rotation angle. The updated object placement information is shown in FIG. 26.

Figure 27:
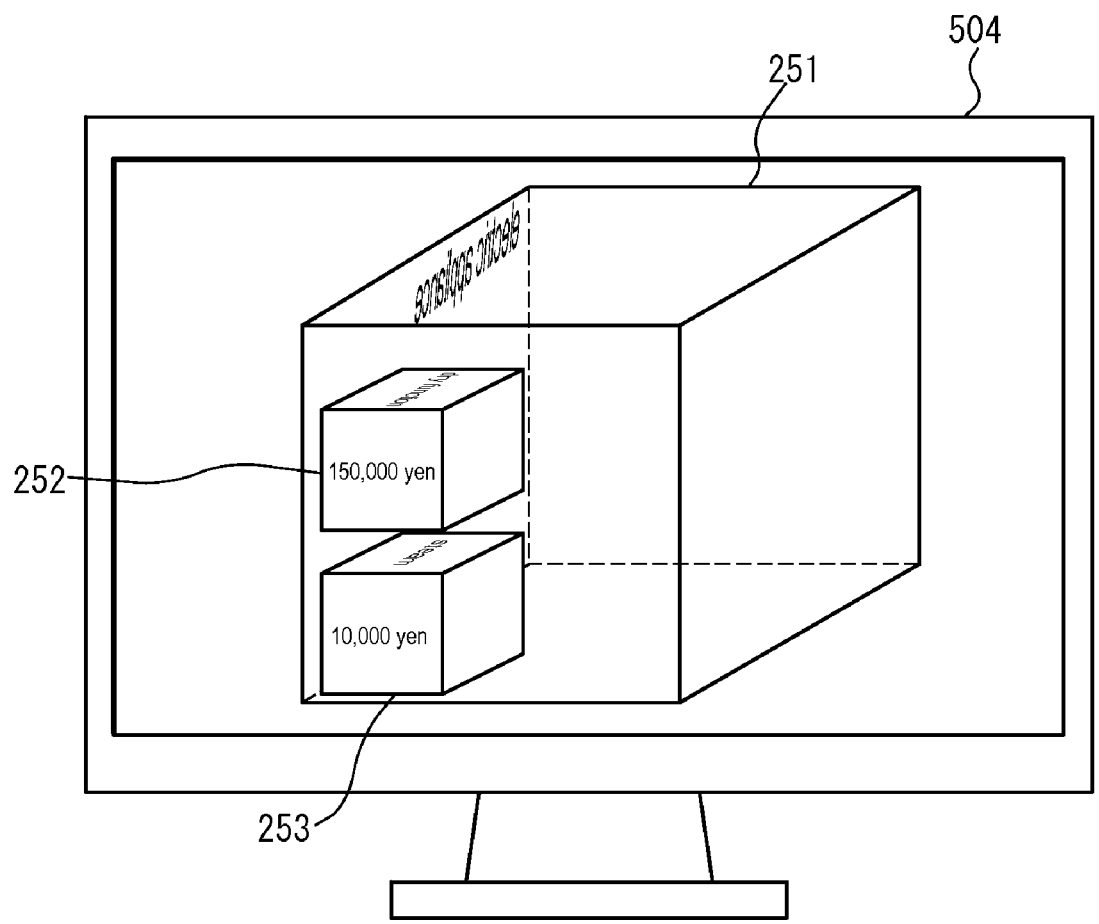
FIG. 27 is a diagram showing an output example of the same information processing apparatus.

Then, the image information of the solid objects is configured using the updated object placement information, and is output from the output portion 106. An output example is shown in FIG. 27.

As described above, in this embodiment, the solid objects have a hierarchical structure, and when the placement of a solid object at a higher level in hierarchy is modified, the placement of a solid object at a lower level in hierarchy is modified such that the relative placement relationship of the solid object at a lower level in hierarchy with the solid object at a higher level in hierarchy will be maintained. Accordingly, when the solid object at a higher level in hierarchy is moved, the solid object at a lower level in hierarchy will move so as to follow that movement. For example, it is possible to cause the side surface, the back surface or the like of multiple solid objects at lower levels in hierarchy to face the front all at once by rotating a solid object at a higher level in hierarchy, thereby realizing better viewing of the information output on these surfaces.

For example, as in the above-described specific example, in a case where a solid object at a higher level in hierarchy is used as the solid object showing the entire catalog, solid objects at lower levels in hierarchy than the level of that sold object are used as the solid objects for showing products included in the catalog, and information relating to the products are placed on the surfaces of the solid objects showing those products, changing the orientation of the solid object at a higher level in hierarchy also changes the orientation of all the solid objects of the multiple products included in the catalog, thereby causing the information placed on the side surface, the back surface or the like of the solid objects of the multiple products to be oriented to positions that can be easily seen. Consequently, it is not necessary to change the orientation of the solid objects of the individual products, making it possible, for example, to check the product information with less effort in a prompt manner. Furthermore, by moving the position of the solid object at a higher level in hierarchy, it is possible to change the position of the entire catalog to a position that can be easily viewed, without changing the solid objects of the individual products.

In the above-described embodiment, when the placement of the solid object at a higher level in hierarchy is modified, the placement of the solid objects at a lower level in hierarchy is modified such that the relative placement of the solid objects at a lower level in hierarchy with respect to the solid object at a higher level in hierarchy will not be changed, using the hierarchical relationship indicated by the first hierarchical information stored in the first hierarchical information storage portion 112. However, in the present invention, instead of providing the first hierarchical information storage portion 112, the object placement information of a solid object located at a lower level in hierarchy may be accumulated in advance in the object placement information storage portion 107 as relative placement information such as relative coordinates with respect to a solid object at a higher level in hierarchy to which that solid object directly belongs. By doing so, even in a case where the object placement information of the solid object at a higher level in hierarchy has been modified, the image information configuration portion 105 or the like calculates, for example, when configuring image information, the information indicating the placement of the solid object at a lower level in hierarchy by making relative modification in correspondence with the placement of the solid object at a higher level in hierarchy, whose placement has been modified, and configures image information of the solid object at a lower level in hierarchy that has been placed according to the calculated information. Accordingly, when the placement of the solid object at a higher level in hierarchy has been modified, it is possible to place the solid object at a lower level in hierarchy such that the relative placement with respect to the solid object at a higher level in hierarchy will not be changed, as in the above-described manner.

Embodiment 3

An information processing apparatus according to this embodiment has a configuration in which the information processing apparatus of Embodiment 2 described above accepts placement information having a hierarchical relationship, and outputs, according to the hierarchical relationship of that placement information, a solid object having the hierarchical relationship corresponding to that hierarchical relationship.

Figure 28:
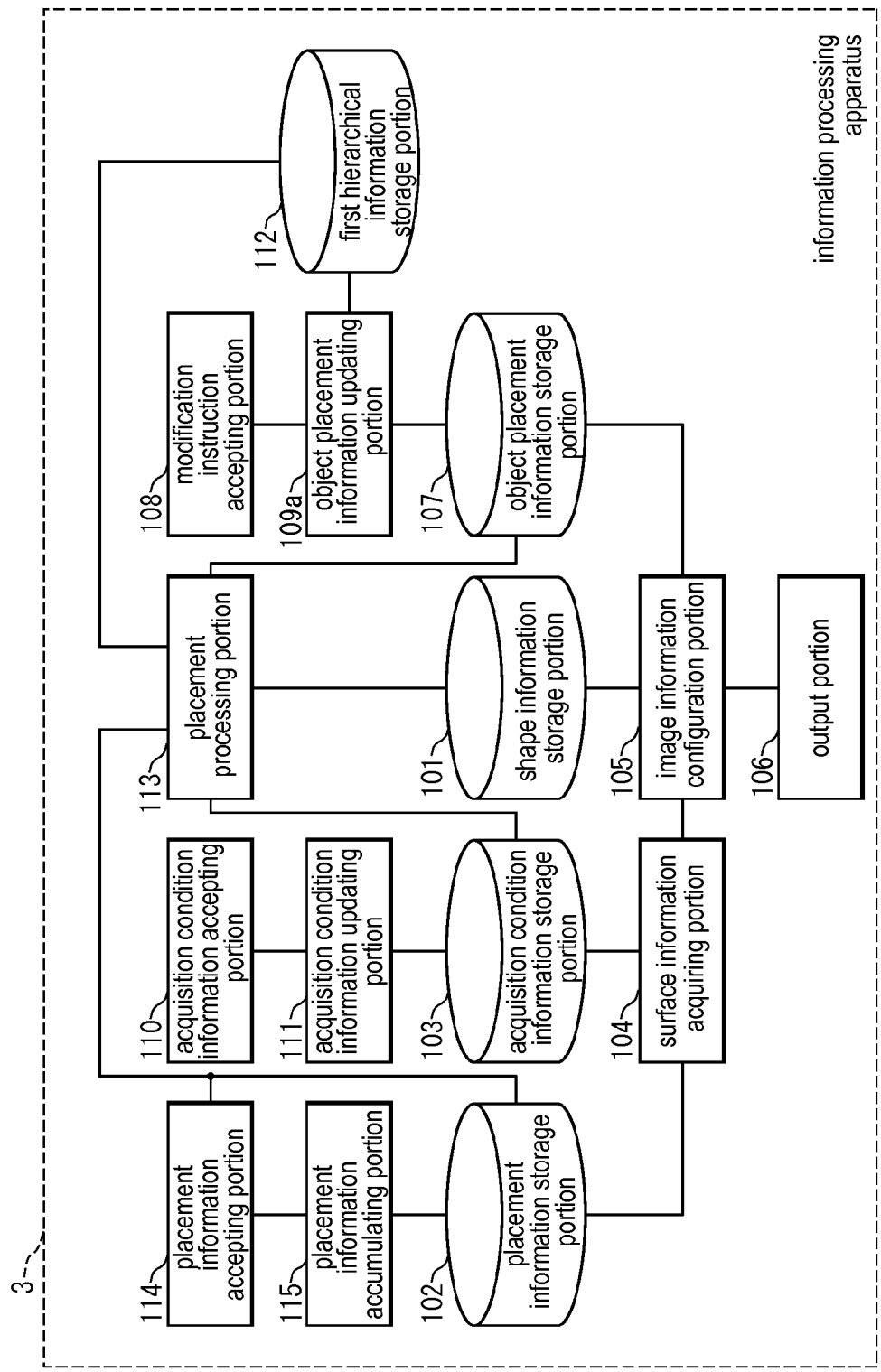
FIG. 28 is a block diagram showing an information processing apparatus according to Embodiment 3.

FIG. 28 is a block diagram showing the configuration of an information processing apparatus 3 according to this embodiment. The information processing apparatus 3 has a configuration in which the processing apparatus of Embodiment 2 above further includes a placement processing portion 113. The configuration other than the placement processing portion 113 is the same as that in Embodiment 2 above, and therefore, a detailed description thereof has been omitted.

In this embodiment, the placement information accepting portion 114 accepts placement information having a hierarchical relationship. Specifically, the placement information having a hierarchical relationship is information in which a hierarchical relationship is defined between pieces of placement information or groups of placement information, or the like. This hierarchical relationship may be specified in any manner. For example, information defining placement information located at a higher level in hierarchy or a lower level in hierarchy may be included in each piece of placement information. For example, in a case where the placement information is tagged information, if a hierarchy can be determined from the inclusion relation between pieces of the tagged information, the placement information is also considered to have a hierarchical relationship. Similarly, information specifying a hierarchy may be defined in a tag or the like in advance, and an element included in that tag in which the hierarchy is defined may be determined as the placement information of a predetermined level in hierarchy. The configuration of the placement information accepting portion 114 is the same as that in Embodiments 1 and 2 above, and therefore, a description thereof has been omitted here. Further, the placement information accepted by the placement information accepting portion 114 is accumulated in the placement information storage portion 102 by the placement information accumulating portion 115 as in Embodiments 1 and 2 above.

The placement processing portion 113 acquires the shape information of a solid object that has a hierarchical relationship corresponding to the hierarchy levels of the placement information having a hierarchical relationship, accepted by the placement information accepting portion 114, and accumulates the shape information in the object placement information storage portion 107. The placement processing portion 113 may determine the hierarchical relationship of the placement information in any manner. For example, when the placement information includes information specifying placement information or a group of placement information located at a higher level in hierarchy or a lower level in hierarchy for each placement information or a group of placement information, the placement processing portion 113 may determine the hierarchical relationship of the placement information from such information. When the placement information is tagged information, the placement processing portion 113 may also determine the hierarchy from the inclusion relation between particular tags or the like. Alternatively, the placement processing portion 113 may determine the hierarchical relationship, using the information indicating a hierarchical relationship that is defined in a tag itself. For example, it is possible to adopt a configuration in which a hierarchy defining tag, which is a tag for defining a hierarchy, is specified in advance, and placement information that is the element of a second hierarchy defining tag contained within the first hierarchy defining tag is determined as placement information at a lower level in hierarchy than that of the placement information that is the element of the first hierarchy defining tag. Furthermore, the placement processing portion 113 acquires the shape information of the solid objects corresponding to the hierarchy of the placement information, using the result of the determination of the hierarchical relationship of the placement information. For example, the placement processing portion 113 acquires the shape information of the solid object for each level in hierarchy of the determined placement information. For example, when pieces of placement information are hierarchized, or placement information and a group of placement information are hierarchized, the placement processing portion 113 acquires the shape information of a solid object for placement information at a higher level in hierarchy, and placement information or a group of placement information at a lower level in hierarchy. Then, the placement processing portion 113 accumulates the acquired placement information in the shape information storage portion 101. When the placement information is tagged information, and particular tags are hierarchized, the placement processing portion 113 may acquire the shape information of a solid object for each of these particular tags. The placement processing portion 113 may acquire the shape information in any manner. For example, the placement processing portion 113 may read shape information that has been provided in advance in a storage medium or the like (not shown). In particular, it is possible to adopt a configuration in which shape information has been provided in advance for each level in hierarchy of solid objects, and shape information corresponding to the level in hierarchy at which each solid object is located is read. It is also possible to configure the shape information in accordance with a pre-specified rule. For example, the shape information of a solid object at a higher level in hierarchy may be configured in accordance with a rule for configuring shape information having a size capable of containing all the solid objects at a lower level in hierarchy. Such a rule or the like is accumulated in advance in a storage medium or the like (not shown). The same applies to other embodiments. It is preferable that the placement processing portion 113 acquires shape information for which the acquisition condition information for each surface of solid objects is stored in the acquisition condition information storage portion. That is, it is preferable to adopt a configuration in which the acquisition condition information for acquiring the surface information is defined for the surfaces of the solid object indicated by the acquired shape information. For example, the acquisition condition information stored in the acquisition condition information storage portion may correspond to all the shape information that can be acquired by the placement processing portion 113. Also, in a case where the placement processing portion 113 acquires shape information that has been provided in advance, the acquisition condition information may be associated with the shape information provided in advance. It is also possible to adopt a configuration in a rule for configuring the acquisition condition information is included in the rule by which the placement processing portion 113 configures the shape information, and the acquisition condition information configured in accordance with that rule is accumulated in the acquisition condition information storage portion in association with the acquired shape information. Furthermore, the placement processing portion 113 also acquires the object placement information of the solid object corresponding to the acquired shape information, and accumulates that information in the object placement information storage portion. This object placement information may be acquired in any manner. The object placement information of each solid object may be configured in accordance with a pre-specified rule, including, for example, a rule specifying the interval or the like between adjacent solid objects, or a rule specifying the placement of solid objects. It is also possible to configure object placement information for setting random placement. At this time, it is preferable to set a rule or the like such that a solid object located at a lower level in hierarchy will be placed within a solid object located at a higher level in hierarchy. Further, the placement processing portion 113 performs processing such that the solid objects corresponding to these pieces of acquired shape information have the same hierarchical relationship as the hierarchical relationship that the placement information has. Specifically, it is possible to adopt a configuration in which first hierarchical information defining the hierarchical information between the solid object corresponding to the shape information acquired by the placement processing portion 113 is configured and accumulated in the first hierarchical information storage portion 112. It is also possible to adopt a configuration in which relative placement information, including, for example, relative coordinates with respect to the object placement information of a solid object at a higher level in hierarchy is configured as at least the object placement information of a solid object that would be located at a lower level in hierarchy, without configuring the first hierarchical information, and the configured object placement information is accumulated in the object placement information storage portion 107. The placement processing portion 113 may be ordinarily implemented by an MPU, a memory, or the like. The processing procedure of the placement processing portion 113 is ordinarily implemented using software, and that software is recorded in a recording medium such as a ROM. However, the processing procedure may be implemented with hardware (a dedicated circuit).

Figure 29:
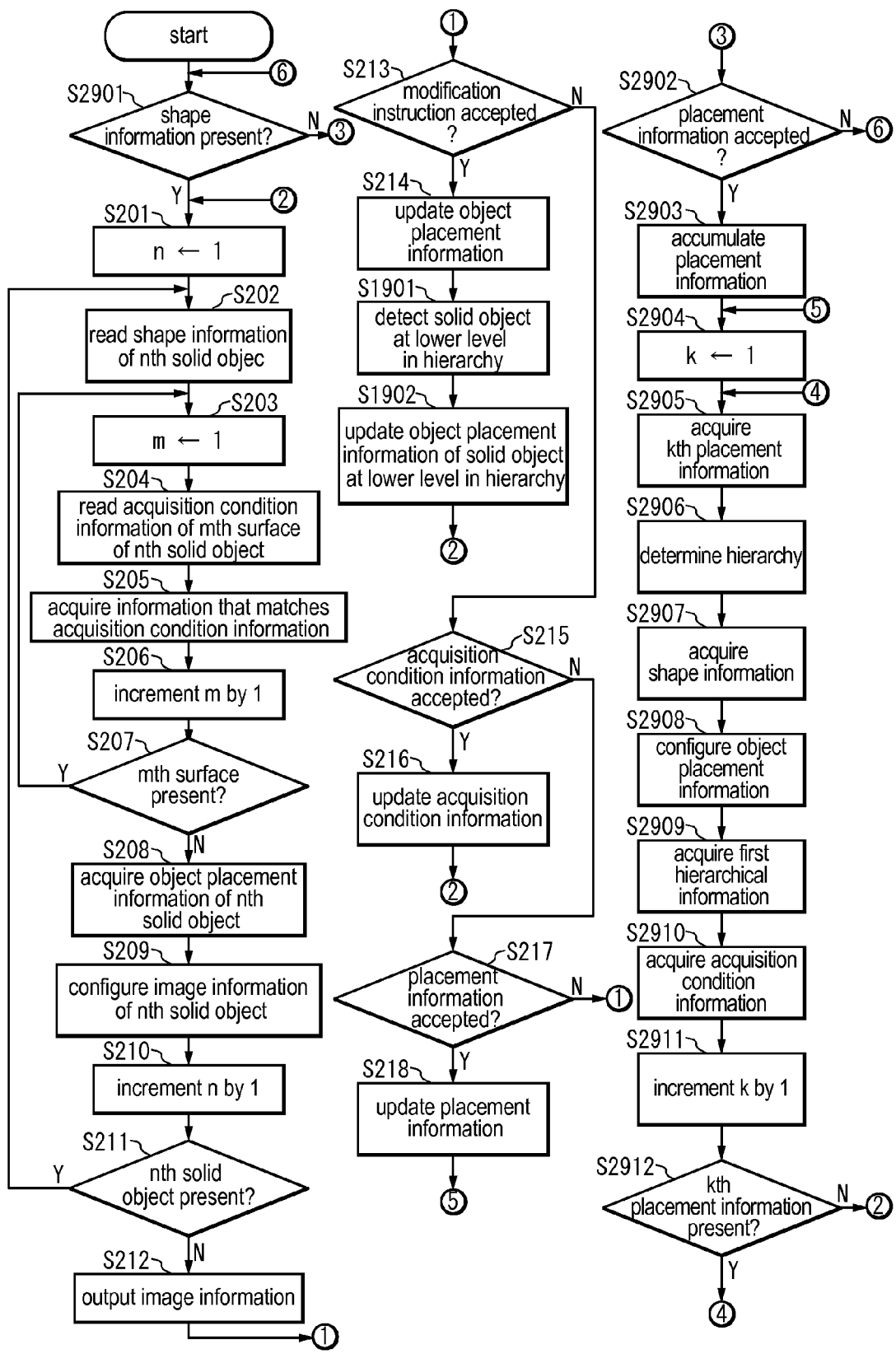
FIG. 29 is a flowchart illustrating an operation of the same information processing apparatus according.

Next, an operation of the information processing apparatus according to this embodiment will be described with reference to FIG. 29. In FIG. 29, the same reference numerals as those in FIGS. 2 and 19 denote similar or corresponding processing, and therefore, a description thereof has been omitted.

(Step S2901) The placement processing portion 113 judges whether or not shape information is stored in the shape information storage portion 101. If it is stored, the procedure moves to Step S201. If it is not stored, the procedure moves to Step S2902.

(Step S2902) The placement information accepting portion 114 judges whether or not placement information has been accepted. If it has been accepted, the procedure moves to Step S2903. If it has not been accepted, the procedure returns to Step S2901.

(Step S2903) The placement information accumulating portion 115 accumulates the placement information accepted in Step S2902 in the placement information storage portion 102.

(Step S2904) The placement processing portion 113 assigns 1 to a counter k.

(Step S2905) The placement processing portion 113 acquires the $k^{th}$ placement information from the placement information accepted in Step S2902. The placement processing portion 113 may acquire the placement information accepted by the placement information accepting portion 114 in any manner. For example, the placement processing portion 113 may read the placement information accumulated in the placement information storage portion 102, or may read the placement accumulation into a recording medium or the like (not shown) in which the placement information accepting portion 114 temporarily stored the placement information. The $k^{th}$ placement information acquired here may be limited in advance only to placement information for which a solid object is configured, such as placement information defining a hierarchy or the like.

(Step S2906) The placement processing portion 113 determines the hierarchy of the $k^{th}$ placement information. For example, the hierarchy may be determined from the information specifying a hierarchy that is included in the placement information. In the case of hierarchically grouped, or so-called nested placement information, the hierarchy may be determined from the hierarchical relationship with other placement information or the like.

(Step S2907) The placement processing portion 113 acquires the shape information for the $k^{th}$ placement information. The placement processing portion 113 may acquire the shape information for the $k^{th}$ placement information in any manner. For example, the placement processing portion 113 may acquire the shape information corresponding to the hierarchy of the $k^{th}$ placement information determined in Step S2906 from one or more pieces of shape information, such as template information of shape information, that has been provided in advance in correspondence with the hierarchy or the like. Alternatively, the placement processing portion 113 may acquire pre-specified shape information, and may subject that shape information to shape modification such as scaling that has been pre-specified according to the hierarchical relationship with other shape information (e.g., scaling with a magnification specified according to the number of levels of hierarchy), thereby configuring shape information. The placement processing portion 113 may also configure shape information in a random manner. The placement processing portion 113 accumulates the acquired shape information in the shape information storage portion 101.

(Step S2908) The placement processing portion 113 configures object placement information indicating the placement of the shape information acquired in Step S2907. The placement processing portion 113 may configure object placement information in any manner. For example, the placement processing portion 113 may configure object placement information such that the shape information is placed in accordance with a pre-specified rule. This rule is, for example, a rule that shape information is to be placed in order from left to right in a virtual three-dimensional space, and when a certain number of pieces of shape information have been placed, shape information is similarly placed from left to right at positions directly underneath. It is also possible to configure the object placement information of the shape information in a random manner. Alternatively, it is possible to configure object placement information such that the $k^{th}$ shape information is placed in order, for example, in ascending order at placement positions that have been decided by default. Instead of deciding the object placement information for each piece of shape information, it is possible to decide the object placement information at once upon completion of acquisition of all the shape information. The placement processing portion 113 accumulates the configured object placement information in the object placement information storage portion 107.

(Step S2909) The placement processing portion 113 acquires the first hierarchical information for the shape information acquired in Step S2907 for example, based on, for example, the result of the determination of the hierarchy performed in Step S2906. The placement processing portion 113 accumulates the acquired first hierarchical information in the first hierarchical information storage portion. Note that this processing may be omitted in a case where the first hierarchical information is not necessary, including, for example, a case where the hierarchical relationship between the shape information is determined from the information indicating the hierarchy included in the placement information.

(Step S2910) The placement processing portion 113 acquires the acquisition condition information for the shape information acquired in Step S2907. The placement processing portion 113 accumulates the acquired acquisition condition information in the acquisition condition information storage portion 103. For example, the placement processing portion 113 reads the acquisition condition information associated with shape information such as hierarchy specific shape accumulation into a recording medium or the like (not shown). It is also possible to acquire the placement information that is placed in the solid object indicated by the $k^{th}$ placement information, and to configure the acquisition condition information such that this acquired placement information is placed in that solid object. Note that this processing may be omitted in a case where it is not necessary to acquire the acquisition condition information, including, for example, a case where the same acquisition condition information is used for all solid objects, or the same acquisition condition information is used for solid objects in a certain hierarchy and the acquisition condition information corresponding to such acquisition condition information has been already stored in the acquisition condition information storage portion 103.

(Step S2911) The placement processing portion 113 increments the value of the counter k by 1.

(Step S2912) The placement processing portion 113 judges whether or not the $k^{th}$ placement information is present in the placement information accepted in Step S2902. If it is present, the procedure returns to Step S2905. If it is not present, the procedure returns to Step S201.

In this flowchart, the procedure moves to Step S2904 after the processing of Step S218.

Note that the processing is ended by powering off or interruption for aborting the processing in the flowchart in FIG. 29.

Next, a specific operation of an information processing apparatus 3 according to this embodiment will be described.

Here, a case is described as an example in which placement information that is to be accepted by the placement information accepting portion 114 is the same XML format data as that shown in FIG. 23.

FIG. 30 shows an example of setting shape information management table for managing setting shape information, which is information for setting shape information for information of a solid object that is a target of display, among the placement information. The setting shape information management table is stored, for example, a memory or the like (not shown). The setting shape information management table has the attributes "target specifying information", "size x", "size y", "size z", "corresponding acquisition condition", and "hierarchy", "size x", "size y", and "size z" are the same as those in FIG. 3. "target specifying information" is information for specifying the placement information that is a target to which the setting shape information concerned is applied, and in this case, is information specifying the tag of the placement information. "corresponding acquisition condition" is information specifying the acquisition condition information corresponding to the solid object indicated by the shape information of the setting shape information concerned, and in this case, information specifying the attribute value of "corresponding acquisition condition" of the acquisition condition information stored in the acquisition condition information storage portion 103. Here, information similar to acquisition condition information in the specific example of Embodiment 2 described above, shown in FIG. 22, is stored in advance in the acquisition condition information storage portion 103.

For example, assuming that the user has caused information processing apparatus 3 to read placement information as shown in FIG. 23 in a state in which the placement information and the shape information are not stored in the information processing apparatus 3, the placement information accepting portion 114 accepts this placement information. The placement information accumulating portion 115 accumulates the placement information accepted by the placement information accepting portion 114 in the placement information storage portion 102.

When the placement information accepting portion 114 has accepted the placement information, and the accepted placement information has been accumulated, the placement processing portion 113 reads the accumulated placement information, and performs processing for outputting a solid object corresponding to that placement information.

Specifically, the placement processing portion 113 first reads the tags of the placement information successively, and judges whether or not the setting shape information tags corresponding to the read tags are present. For example, in the placement information shown in FIG. 23, the read placement information tags are compared with "target specifying information" of the setting shape information shown in FIG. 30, and it is judged whether or not matching "target specifying information" is present. If matching "target specifying information" is present, the placement processing portion 113 acquires the attribute values of "size x", "size y", "size z", and "corresponding acquisition condition" of the record having matching "target specifying information", from among the records of setting shape information. Then, the placement processing portion 113 stores those acquired attribute values in the shape information storage portion 101 as the shape information of the placement information to which those tags are added. Further, the placement processing portion 113 acquires information for identifying the placement information present in the area between the start tag and end tag of the placement tag where this matching "target specifying information" has been determined to be present. Here, by way of example, the placement processing portion 113 configures a tag having a value in which the text "name" is added to the attribute values of the "target specifying information", retrieves the configured tag from the above-described area between the start tag and the end tag of the placement tag where the matching "target specifying information" has been determined to be present, and acquires the element of the retrieved tag. Then, the placement processing portion 113 accumulates the acquired element as the attribute value "corresponding group" of the shape information accumulated in the shape information storage portion 101. Note that the tags used when acquiring the information for identifying the placement information may be specified in advance.

For example, the placement processing portion 113 reads the start tag "catalog" of the placement information shown in FIG. 23, and then retrieves the record having "target specifying information" that matches the read tag "catalog" from the setting shape information. Here, since the attribute value of "target specifying information" in the record in the first row is "catalog" in the setting shape information shown in FIG. 30, the placement processing portion 113 acquires the attribute values of "size x", "size y", "size z", and "corresponding acquisition condition" in the records in the first row, as the shape information, adds "object ID" thereto, and accumulates the information in the shape information storage portion 101. Further, the placement processing portion 113 creates the character string "catalog name", in which "name" is added "catalog", detects the tag matching that character string in the area between the start tag of the end tag of "catalog", and acquires the attribute value "electric appliance", which is the element of the detected "catalog name". Then, the placement processing portion 113 configures the value 'catalog name "electric appliance"', which includes the acquired attribute value "electric appliance", and accumulates this value in the shape information storage portion 101 as the "corresponding group" attribute value of the shape information acquired as above. Consequently, shape information similar to, for example, the shape information whose "object ID" is "OBJ11" shown in FIG. 20 is accumulated. Here, assuming that acquisition condition information similar to the acquisition condition information shown in FIG. 22 is stored in advance in the acquisition condition information storage portion 103, the acquisition condition information corresponding to this shape information is information of the record whose "corresponding acquisition condition information" is "catalog" among the acquisition condition information shown in FIG. 22. It is also possible to adopt a configuration in which the acquisition condition information corresponding to "corresponding acquisition condition" has been accumulated in advance in a storage medium or the like (not shown), and, upon acquiring the shape information, the placement processing portion 113 reads the acquisition condition information corresponding to that shape accumulation from the recording medium or the like (not shown), and accumulates that information in the acquisition condition information storage portion 103.

Further, the placement processing portion 113 determines the object placement information of the solid object indicated by the shape information accumulated as above, in accordance with a pre-specified rule, and accumulates the determined object placement information in the object placement information storage portion 107 in association with the shape information. Here, for example, assuming that a rule that a solid object at a first hierarchy is to be placed in order from left to right starting from pre-specified placement start coordinates, for example, (300, 300, 300), in a pre-specified orientation, for example, with the rotation angle (0, 0, 0) such that the interval between the adjacent objects is "50" is specified as such a rule, the placement processing portion 113 determines the object placement information in accordance with this rule. Here, this solid object is the first solid object, and therefore, as with the object placement information whose "object ID" is "OBJ11" in FIG. 21, the object placement information indicating the pre-specified placement start coordinates is determined to be the information indicating the placement of the solid object corresponding to this shape information.

Further, the placement processing portion 113 configures first hierarchical information from the hierarchical relationship of the placement information for which the shape information has been acquired, and accumulates the first hierarchical information in the first hierarchical information storage portion 112. Here, since the tag "catalog" is a tag at the first hierarchy, i.e., the highest level in hierarchy, first hierarchical information whose value of "higher level in hierarchy" is "−" is configured as the first hierarchical information corresponding to the shape information acquired for that "catalog" tag, as with the first hierarchical information whose "object ID" is "OBJ11" in the first hierarchical information management table shown in FIG. 24

Next, the placement processing portion 113 reads the tag "catalog name". Since this tag does not match any of "target specifying information" of the setting shape information shown in FIG. 30, the placement processing portion 113 judges that it is not necessary to set the shape information for this tag.

Next, the placement processing portion 113 reads the tag "product". Since this tag matches the record in the second row of "target specifying information" in the setting shape information shown in FIG. 30, the placement processing portion 113 acquires the attribute values of "size x", "size y", "size z", and "corresponding acquisition condition" in the records in the second row, as the shape information, adds "object ID" thereto, and accumulates the information in the shape information storage portion 101. Further, the placement processing portion 113 creates the character string "product name", in which "name" is added to "product", detects the tag matching that character string in the area between the start tag and the end tag of "product", and acquires the attribute value "washing machine", which is the element of the detected "product name". Then, the placement processing portion 113 configures the value 'product name "washing machine"', which includes the acquired attribute value "washing machine", and accumulates this value in the shape information storage portion 101 as the attribute value of "corresponding group" of the shape information acquired as above. Further, the acquisition condition information corresponding to this shape information is the same as the information of the record whose "corresponding acquisition condition information" is "product" among the acquisition condition information shown in FIG. 22.

Further, the placement processing portion 113 determines the object placement information of the solid object indicated by the shape information accumulated as above, in accordance with a pre-specified rule, and accumulates the determined object placement information in the object placement information storage portion 107 in association with the shape information. Here, for example, assuming that a rule that a solid object at a second hierarchy is to be placed in order from left to right starting from pre-specified placement start coordinates in a pre-specified orientation within an area in which a first hierarchy solid object to which they directly belong such that the interval between the adjacent objects is "50" is specified as such a rule, the placement processing portion 113 determines the object placement information in accordance with this rule. Here, since this solid object is the first of the solid objects directly belonging to the higher level solid object corresponding to the tag "catalog", the object placement information indicating the pre-specified placement start coordinates within the solid object to which it directly belong is specified as the object placement information corresponding to this shape information.

Further, the placement processing portion 113 configures first hierarchical information based on the hierarchical relationship of the placement information for which the shape information has been acquired, and accumulates the first hierarchical information in the first hierarchical information storage portion 112. Here, since the tag "product" is a second hierarchy tag placed between the start tag "catalog" and the end tag "catalog", the first hierarchical information corresponding to the shape information acquired for this "product" is the information whose value of "higher level in hierarchy" is "object ID" of the solid object at a higher level in hierarchy to which it directly belong, i.e., the solid object whose catalog name is "electric appliance", as with the record whose "object ID" is "OBJ12" in the first hierarchical information management table shown in FIG. 24.

By repeatedly performing processing as described above for the placement information shown in FIG. 23, information for outputting solid objects, such as shape information, can be obtained.

The shape information configured in the above-described manner is the same as that shown in FIG. 20. Also, the object placement information is the same as that shown in FIG. 21. Also, the first hierarchical information is the same as that shown in FIG. 24.

The processing or the like for outputting a solid object using the information configured in the above-described manner is the same as that is the above-described embodiment, and therefore, a description thereof has been omitted.

A display example in a case where solid objects are displayed using information configured in correspondence with the placement information in the above-described manner is the same as that shown in FIG. 25.

As described above, according to this embodiment, it is possible to configure information for outputting a solid object on which the placement information is placed, such as the shape information, the object placement information and the acquisition condition information in an easy and prompt manner. It is also possible to output a solid object corresponding to the placement information in an easy and prompt manner.

Furthermore, according to this embodiment, it is possible to output a solid object corresponding to the hierarchical relationship of the placement information, making it possible to easily understand the hierarchical relationship or the like between placement information to which the output solid object corresponds to.

Further, in each of the above-described embodiments, each process (each function) may be realized by integrated processing by a single device (system), or alternatively, may be realized by distributed processing by a plurality of devices.

It will be appreciated that in each of the above-described embodiments, two or more communication means (e.g., information transmission portions) present in a single apparatus may be physically implemented with a single medium.

Also, in the above-described embodiments, the information relating to the processing performed by each of the components, such as the information accepted, acquired, selected, created, transmitted, or received, and the information used by each of the components during processing, such as a threshold value, a numerical formula, or an address may be retained temporarily, or for a long period of time in a recording medium (not shown) even if not specified in the description above. Accumulation of the information in the storage medium (not shown) may be performed by each of the components, or by an accumulating portion (not shown). Reading of the information from the storage medium (not shown) may be performed by each of the components, or by a reading portion (not shown).

Further, in each of the above-described embodiments, the case was described in which the information processing apparatus is a stand-alone apparatus. The information processing apparatus may be a stand-alone apparatus, or may be a server device in a server/client system. In the latter case, the output portion and the accepting portion receives input or output a screen, via a communications line.

In each of the above-described embodiments, each of the components may be constituted by dedicated hardware, or alternatively, components that can be implemented by software may be implemented by executing a program. For example, each of the components may be implemented by a program executing portion such as a CPU reading out and executing a software program stored in a storage medium such as a hard disk or a semiconductor memory.

The software that implements the information processing apparatus in each of the above-described embodiments may be the following program. Specifically, this program is a program for causing a computer to function as: a surface information acquiring portion that acquires, from placement information stored in a placement information storage portion, which is one or more pieces of information that can be placed on a surface constituting a solid object, which is a three-dimensional object, surface information, which is information that is to be placed on one or more surfaces of the solid object, using acquisition condition information stored in an acquisition condition information storage portion, which is information indicating a condition for acquiring information that is to be each placed on one or more surfaces constituting the solid object,; an image information configuration portion that reads shape information stored in a shape information storage portion, which is information specifying a shape of the solid object, and configures, for one or more surfaces of the read solid object, image information in which the surface information acquired by the surface information acquiring portion is placed; and an output portion that outputs the image information configured by the image information configuration portion.

In this program, functions realized by the program do not include a function realized only by hardware. For example, a function realized only by hardware such as a modem or an interface card in an acquiring portion that acquires information, an output portion that outputs information, and the like is not included in the functions realized by the program.

Furthermore, this program may be executed by a single computer or multiple computers. More specifically, centralized processing may be performed, or distributed processing may be performed.

Figure 31:
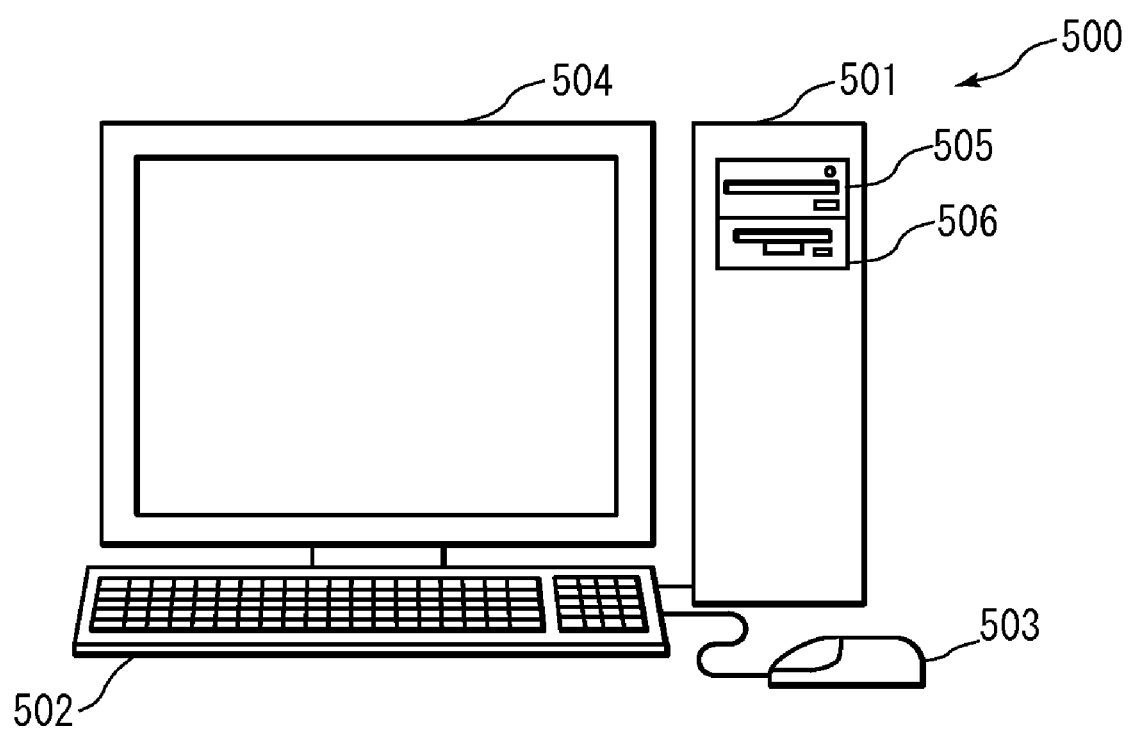
FIG. 31 is a schematic diagram showing an example of the external appearance of a computer system according to the above-described embodiments.

FIG. 31 is a schematic diagram showing an example of the external appearance a computer that executes the above-described program to realize the information processing apparatus according to the above-described embodiments. The above-described embodiments can be implemented by computer hardware and a computer program executed thereon.

In FIG. 31, a computer system 500 includes a computer 501 that includes CD-ROM (compact disk read only memory) drive 505 and an FD (flexible disk) drive 506, a keyboard 502, a mouse 503, and a monitor 504.

Figure 32:
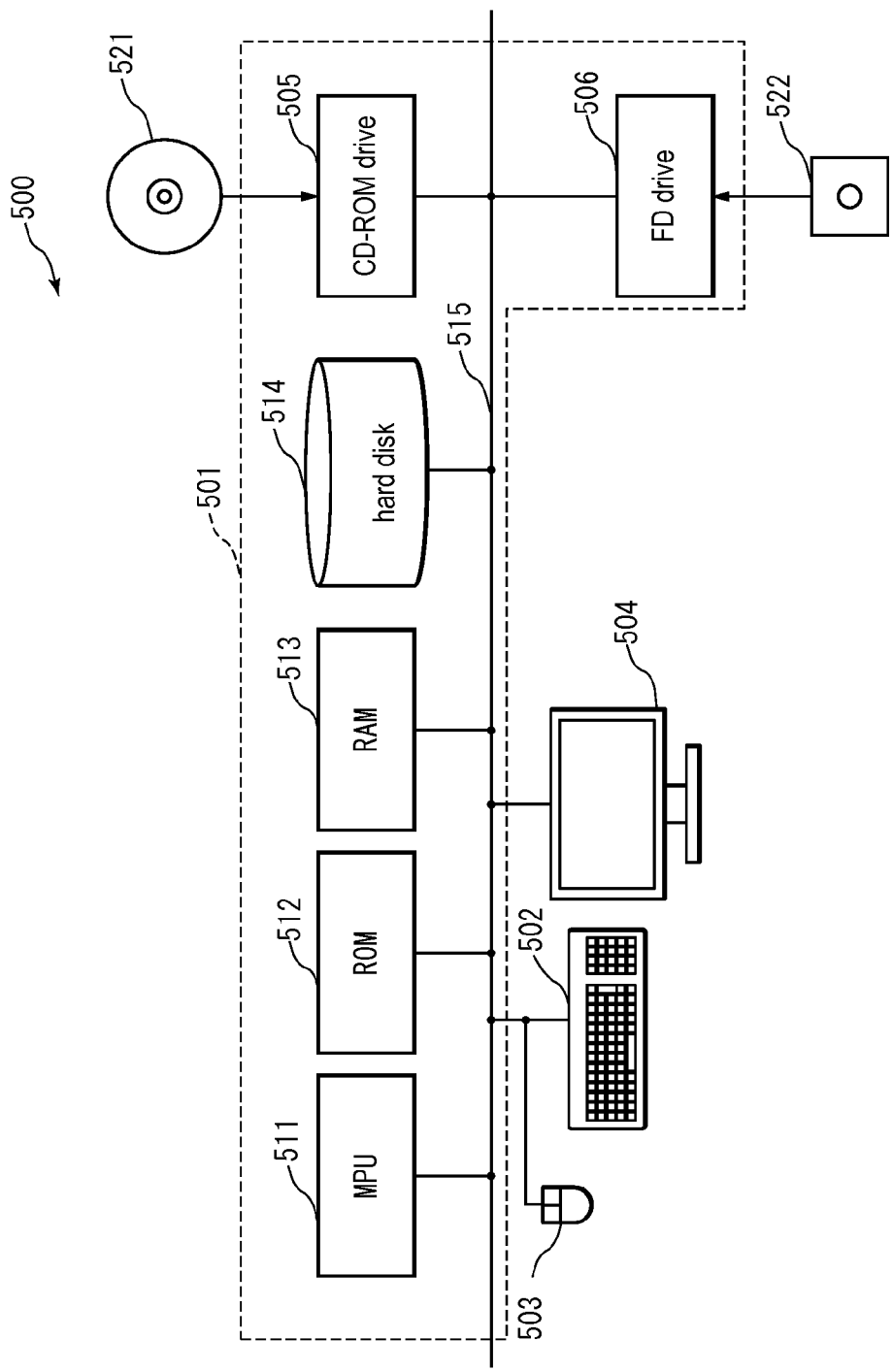
FIG. 32 is a diagram showing an example of a computer system according to the above-described embodiments.

FIG. 32 is a diagram showing the computer system. In FIG. 32, the computer 501 includes not only the CD-ROM drive 505 and the FD drive 506, but also an MPU (micro processing unit) 511, a ROM (read only memory) 512 in which a program such as a startup program is to be stored, a RAM (random access memory) 513 that is connected to the MPU 511 and in which a command of an application program is temporarily stored and a temporary storage area is provided, a hard disk 514 in which an application program, a system program, and data are stored, and a bus 515 that connects the MPU 511, the ROM 512, and the like. The computer 501 may include a network card (not shown) for providing a connection to a LAN.

The program for causing the computer system 500 to execute the functions of the information processing apparatus according to the above-described embodiments may be stored on a CD-ROM 521 or an FD 522, inserted into the CD-ROM drive 505 or the FD drive 506, and transmitted to the hard disk 514. Alternatively, the program may be transmitted to the computer 501 via a network (not shown) and stored on the hard disk 514. At the time of execution, the program is loaded into the RAM 513. The program may be loaded from the CD-ROM 521 or the FD 522, or directly from a network.

The program does not necessarily have to include, for example, an operating system (OS) or a third party program for causing the computer 501 to execute the functions of the information processing apparatus according to the above-described embodiments. The program may only include a command portion to call an appropriate function (module) in a controlled mode and obtain desired results. The manner in which the computer system 500 operates is well known, and thus a detailed description thereof has been omitted.

Although the case was described as an example in which the apparatus that executes the above-described program to implement the information processing apparatus according to the above-described embodiments is a computer, the apparatus that executes the above-described program to implement the information processing apparatus according to each of the foregoing embodiments in the present invention may be any apparatus that includes an MPU, a memory, or the like as with a computer. For example, it may be a mobile phone, a PDA (personal digital assistant), highly-functional mobile phone configured by combining a mobile phone and an information terminal, a portable digital music player, and an audio-visual device with a display device, such as a television.

The present invention is not limited to the embodiments set forth herein. It will be appreciated that various modifications are possible within the scope of the present invention.

INDUSTRIAL APPLICABILITY

As described above, the information processing apparatus according to the present invention is suitable as an apparatus that outputs information, and is particularly useful, for example, as an information processing apparatus that outputs information placed on the surfaces of a solid object.

What is claimed is:

1. An information processing apparatus for displaying in three dimensions information with a hierarchical relationship on surfaces of solid objects with a corresponding hierarchical relationship, comprising:
   a shape information storage portion in which shape information, which is information specifying a shape of a solid object, which is a three-dimensional object, can be stored;
   a placement information storage portion in which placement information, which is one or more pieces of information that can be placed on a surface constituting the solid object, can be stored;
   an acquisition condition information storage portion in which acquisition condition information for a specific hierarchical level, which is information indicating a condition for acquiring different pieces of information that is to be each placed on different surfaces constituting the solid object from the placement information, can be stored;

a surface information acquiring portion that acquires surface information, which is information that is to be placed on at least three surfaces of the solid object, from the placement information, using the acquisition condition information;

an image information configuration portion that reads the shape information of the solid object, and configures, for one or more surfaces of the read solid object, image information in which the surface information acquired by the surface information acquiring portion is placed; and an output portion that outputs the image information configured by the image information configuration portion, wherein the acquisition condition information for a specific hierarchical level stored in the acquisition condition information storage portion is an arithmetic formula for calculating the average of the multiple pieces of placement information, and the surface information acquiring portion acquires the placement information that is the average of the values of the multiple pieces of placement information as the surface information.

2. The information processing apparatus according to claim 1, further comprising an object placement information storage portion in which object placement information, which is information specifying the placement of the solid object, can be stored, wherein the image information configuration portion configures image information in which the solid object is placed as specified by the object placement information.

3. The information processing apparatus according to claim 2, further comprising:

a modification instruction accepting portion that accepts a modification instruction for the placement of the solid object; and an object placement information updating portion that updates, according to the modification instruction accepted by the modification instruction accepting portion, the object placement information of the solid object that is stored in the object placement information storage portion and to which said modification instruction is targeted.

4. The information processing apparatus according to claim 3, wherein the solid object has a hierarchical relationship with other solid objects, and when the placement of a solid object at a higher level in hierarchy among the solid objects has been modified, the placement of a solid object at a lower level in hierarchy that directly belongs to the solid object whose placement has been modified is modified such that the relative placement relationship with said solid object whose placement has been modified is maintained.

5. The information processing apparatus according to claim 4, wherein the object placement information of a solid object at a lower level in hierarchy among the object placement information that can be stored in the object placement information storage portion is constituted by information specifying the relative placement with respect to a solid object at a higher level in hierarchy to which said solid object directly belongs.

6. The information processing apparatus according to claim 5, further comprising a first hierarchical information storage portion in which first hierarchical information which is hierarchical information specifying a hierarchical relationship between the solid objects, can be stored, wherein the object placement information updating portion updates, according to a modification instruction for the placement of a solid object that has been accepted by the modification instruction accepting portion, the object placement information of a solid object at a lower level in hierarchy than that of the solid object to which the modification instruction is targeted such that the relative placement relationship with the solid object to which the modification instruction is targeted will not be changed, using the first hierarchical information.

7. The information processing apparatus according to claim 4, further comprising:

a placement information accepting portion that accepts placement information having a hierarchical relationship;

a placement information accumulating portion that accumulates the placement information in the placement information storage portion; and a placement processing portion that acquires the shape information of a solid object that has a hierarchical relationship corresponding to hierarchy levels of the placement information accepted by the placement information accepting portion, and accumulates said shape information in the object placement information storage portion.

8. The information processing apparatus according to claim 4, wherein the solid object includes a folder object, which is a solid object for indicating a hierarchical structure between one or more solid objects.

9. The information processing apparatus according to claim 3, further comprising a first hierarchical information storage portion in which first hierarchical information which is hierarchical information specifying a hierarchical relationship between the solid objects, can be stored, wherein the object placement information updating portion updates, according to the modification instruction for the placement of the solid object that has been accepted by the modification instruction accepting portion, the object placement information of a solid object at a lower level in hierarchy than that of the solid object to which the modification instruction is targeted such that a relative placement relationship with the solid object to which the modification instruction is targeted will not be changed, using the first hierarchical information.

10. The information processing apparatus according to claim 2, wherein the solid object has a hierarchical relationship with other solid objects, and when the placement of a solid object at a higher level in hierarchy among the solid objects has been modified, the placement of a solid object at a lower level in hierarchy that directly belongs to the solid object whose placement has been modified is modified such that the relative placement relationship with said solid object whose placement has been modified is maintained.

11. The information processing apparatus according to claim 10,
wherein the object placement information of a solid object at a lower level in hierarchy among the object placement information that can be stored in the object placement information storage portion is constituted by information specifying the relative placement with respect to a solid object at a higher level in hierarchy to which said solid object directly belongs.

12. The information processing apparatus according to claim 10, further comprising:
a placement information accepting portion that accepts placement information having a hierarchical relationship;
a placement information accumulating portion that accumulates the placement information in the placement information storage portion; and
a placement processing portion that acquires the shape information of a solid object that has a hierarchical relationship corresponding to hierarchy levels of the placement information accepted by the placement information accepting portion, and accumulates said shape information in the object placement information storage portion.

13. The information processing apparatus according to claim 10,
wherein the solid object includes a folder object, which is a solid object for indicating a hierarchical structure between one or more solid objects.

14. The information processing apparatus according to claim 2, further comprising:
an acquisition condition information accepting portion that accepts the acquisition condition information for one or more surfaces constituting the solid object; and
an acquisition condition information updating portion that updates the acquisition condition information stored in the acquisition condition information storage portion using the acquisition condition information accepted by the acquisition condition information accepting portion.

15. The information processing apparatus according to claim 1, further comprising:
an acquisition condition information accepting portion that accepts the acquisition condition information for one or more surfaces constituting the solid object; and
an acquisition condition information updating portion that updates the acquisition condition information stored in the acquisition condition information storage portion using the acquisition condition information accepted by the acquisition condition information accepting portion.

16. The information processing apparatus according to claim 1, wherein:
the placement information is the different pieces of information, which comprises tagged data, that is each placed on the different surfaces constituting the solid object;
the acquisition condition information is associated with the different surfaces constituting the solid object;
the surface information acquiring portion acquires the surface information for each of the different surfaces constituting the solid object using the acquisition condition information to obtain the placement information that is each placed on the different surfaces constituting the solid object; and
the image information configuration portion configures the image information for each of the different surfaces constituting the solid object such that different tagged data is placed on each surface of the solid object.

17. The information processing apparatus according to claim 1, wherein: the acquisition condition information stored in the acquisition condition information storage portion is an arithmetic operation that correlates the one or more pieces of information, which is the placement information, into correlated placement information representative of the arithmetic formula.

18. An information processing method performed to display in three dimensions information with a hierarchical relationship on surfaces of solid objects with a corresponding hierarchical relationship for using: a shape information storage portion in which shape information, which is information specifying a shape of a solid object, which is a three-dimensional object, can be stored; a placement information storage portion in which placement information, which is one or more pieces of information that can be placed on a surface constituting the solid object, can be stored; an acquisition condition information storage portion in which acquisition condition information for a specific hierarchical level, which is information indicating a condition for acquiring different pieces of information that is to be each placed on different surfaces constituting the solid object from the placement information, can be stored; a surface information acquiring portion; an image information configuration portion; and an output portion, the method comprising:
a surface information acquiring step, performed by the surface information acquiring portion, of acquiring surface information, which is information that is to be placed on one or more surfaces of the solid object, from the placement information, using the acquisition condition information;
an image information configuring step, performed by the image information configuration portion, of reading the shape information of the solid object, and configuring, for
at least three surfaces of the read solid object, image information in which the surface information acquired by the surface information acquiring portion is placed; and
an output step, performed by the output portion, of outputting the image information configured in the image information configuring step,
wherein the acquisition condition information for a specific hierarchical level stored in the acquisition condition information storage portion is an arithmetic formula for calculating the average of the multiple pieces of placement information, and
the surface information acquiring portion acquires the placement information that is the average of the values of the multiple pieces of placement information as the surface information.

19. The information processing method according to claim 18, wherein:
the acquisition condition information stored in the acquisition condition information storage portion is an arithmetic operation that correlates the one or more pieces of information, which is the placement information, into correlated placement information representative of the arithmetic formula.

20. A computer program product comprising a non-transitory computer usable storage medium having readable program code embodied in the storage medium, the computer program product includes at least one component operable to display in three dimensions information with a hierarchical relationship on surfaces of solid objects with a corresponding hierarchical relationship and to function as:
a surface information acquiring portion that acquires, from placement information stored in a placement information storage portion, which is one or more pieces of information that can be placed on a surface constituting a solid object, which is a three-dimensional object, surface information, which is information that is to be placed on at least three surfaces of the solid object, using acquisition condition information for a specific hierarchical level stored in an acquisition condition information storage portion, which is information indicating a condition for acquiring different pieces of information that is to be each placed on different surfaces constituting the solid object;

an image information configuration portion that reads shape information stored in a shape information storage portion, which is information specifying a shape of the solid object, and configures, for one or more surfaces of the read solid object, image information in which the surface information acquired by the surface information acquiring portion is placed; and an output portion that outputs the image information configured by the image information configuration portion, wherein the acquisition condition information for a specific hierarchical level stored in the acquisition condition information storage portion is an arithmetic formula for calculating the average of the multiple pieces of placement information, and the surface information acquiring portion acquires the placement information that is the average of the values of the multiple pieces of placement information as the surface information.

21. The computer program product according to claim 20, wherein:

the acquisition condition information stored in the acquisition condition information storage portion is an arithmetic operation that correlates the one or more pieces of information, which is the placement information, into correlated placement information representative of the arithmetic formula.

* * * * *